United States Patent
Ho et al.

(10) Patent No.: US 9,141,827 B2
(45) Date of Patent: *Sep. 22, 2015

(54) COMPUTER-AIDED LEARNING SYSTEM AND METHOD

(75) Inventors: Chi Fai Ho, Union City, CA (US); Peter P. Tong, Mountain View, CA (US)

(73) Assignee: IpLearn, LLC, Mountain View, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/734,932

(22) Filed: Dec. 12, 2003

(65) Prior Publication Data

US 2004/0126748 A1 Jul. 1, 2004

Related U.S. Application Data

(63) Continuation of application No. 09/656,390, filed on Sep. 6, 2000, now Pat. No. 6,688,088, which is a continuation of application No. 09/037,768, filed on Mar. 10, 1998, now Pat. No. 6,139,330, which is a (Continued)

(51) Int. Cl.
| | |
|---|---|
| G09B 7/04 | (2006.01) |
| G06F 21/62 | (2013.01) |
| G06F 21/00 | (2013.01) |
| G09B 5/06 | (2006.01) |
| G09B 5/14 | (2006.01) |
| G09B 7/02 | (2006.01) |
| G09B 5/00 | (2006.01) |

(52) U.S. Cl.
CPC .............. *G06F 21/629* (2013.01); *G06F 21/00* (2013.01); *G09B 5/00* (2013.01); *G09B 5/065* (2013.01); *G09B 5/14* (2013.01); *G09B 7/02* (2013.01); *G09B 7/04* (2013.01)

(58) Field of Classification Search
USPC .................................. 434/118, 322, 362, 353
See application file for complete search history.

(56) References Cited

U.S. PATENT DOCUMENTS

| | | |
|---|---|---|
| 3,233,346 A | 2/1966 | Cornberg |
| 3,573,359 A | 4/1971 | Guisinger ...................... 178/6.6 |
| 4,006,539 A | 2/1977 | Slomski |
| 4,037,332 A | 7/1977 | Petrusinsky ...................... 35/35 |
| 4,089,124 A | 5/1978 | Burtis et al. |

(Continued)

FOREIGN PATENT DOCUMENTS

| | | |
|---|---|---|
| EP | 0 710 942 A2 | 8/1996 |
| GB | 2 289 364 A | 11/1995 |

(Continued)

OTHER PUBLICATIONS

PLM ( Plato Learning Managament).

(Continued)

*Primary Examiner* — Steven J Hylinski

(57) ABSTRACT

A computer-aided learning method and apparatus based on a super-recommendation generator, which is configured to assess a user's or a student's understanding in a subject, reward the user who has reached one or more milestones in the subject, further the user's understanding in the subject through relationship learning, reinforce the user's understanding in the subject through reviews, and restrict the user from enjoying entertainment materials under certain condition, with the entertainment materials requiring a device to fulfill its entertainment purpose. The generator does not have to be configured to perform all of the above functions.

16 Claims, 10 Drawing Sheets

Related U.S. Application Data continuation-in-part of application No. 08/618,193, filed on Mar. 19, 1996, now Pat. No. 5,779,486, and a continuation-in-part of application No. 08/633,582, filed on Apr. 17, 1996, now Pat. No. 5,743,746, and a continuation-in-part of application No. 08/664,023, filed on May 28, 1996, now Pat. No. 5,727,951, and a continuation-in-part of application No. 08/675,391, filed on Jul. 2, 1996, now Pat. No. 5,863,208, and a continuation-in-part of application No. 08/707,189, filed on Sep. 3, 1996, now Pat. No. 5,743,743.

(56) References Cited

U.S. PATENT DOCUMENTS

| | | | |
|---|---|---|---|
| 4,464,121 A | 8/1984 | Perelli | |
| 4,611,996 A | 9/1986 | Stoner | |
| 4,705,479 A | 11/1987 | Maron | |
| 4,798,543 A | 1/1989 | Spiece | |
| 4,847,784 A | 7/1989 | Clancey | |
| 4,867,685 A | 9/1989 | Brush et al. | |
| 4,894,777 A | 1/1990 | Negishi et al. | 600/558 |
| 4,926,255 A | 5/1990 | Von Kohorn | |
| 5,002,491 A | 3/1991 | Abrahamson et al. | |
| 5,004,966 A | 4/1991 | Eakin | |
| 5,029,081 A | 7/1991 | Kagawa | |
| 5,035,625 A | 7/1991 | Monson et al. | |
| 5,099,431 A | 3/1992 | Natarajan | |
| 5,103,498 A | 4/1992 | Lanier et al. | |
| 5,117,353 A | 5/1992 | Stipanovich et al. | |
| 5,164,897 A | 11/1992 | Clark et al. | |
| 5,168,372 A | 12/1992 | Sweetser | |
| 5,173,051 A | 12/1992 | May et al. | |
| 5,176,520 A | 1/1993 | Hamilton | |
| 5,195,033 A | 3/1993 | Samph et al. | |
| 5,197,004 A | 3/1993 | Sobotka et al. | |
| 5,211,563 A | 5/1993 | Haga et al. | 434/322 |
| 5,220,501 A | 6/1993 | Lawlor et al. | |
| 5,224,173 A | 6/1993 | Kuhns et al. | |
| 5,241,671 A | 8/1993 | Reed et al. | |
| 5,251,294 A | 10/1993 | Abelow | |
| 5,255,347 A | 10/1993 | Matsuba et al. | |
| 5,257,185 A | 10/1993 | Farley et al. | |
| 5,259,766 A | 11/1993 | Sack et al. | |
| 5,263,869 A | 11/1993 | Ziv-El | |
| 5,267,865 A * | 12/1993 | Lee et al. | 434/350 |
| 5,270,920 A | 12/1993 | Pearse et al. | |
| 5,286,036 A | 2/1994 | Barabash | |
| 5,302,132 A | 4/1994 | Corder | |
| 5,306,154 A * | 4/1994 | Ujita et al. | 434/218 |
| 5,306,878 A | 4/1994 | Kubo | |
| 5,310,349 A | 5/1994 | Daniels et al. | |
| 5,316,485 A | 5/1994 | Hirose | |
| 5,320,538 A | 6/1994 | Baum | |
| 5,326,270 A | 7/1994 | Ostby et al. | |
| 5,333,272 A | 7/1994 | Capek et al. | |
| 5,344,326 A | 9/1994 | Ferris | |
| 5,362,069 A | 11/1994 | Hall-Tipping | |
| 5,370,399 A | 12/1994 | Liverance | |
| 5,372,507 A * | 12/1994 | Goleh | 434/118 |
| 5,387,104 A | 2/1995 | Corder | |
| 5,395,243 A | 3/1995 | Lubin et al. | |
| 5,411,271 A | 5/1995 | Mirando | |
| 5,416,694 A | 5/1995 | Parrish et al. | |
| 5,418,717 A | 5/1995 | Su et al. | |
| 5,421,730 A | 6/1995 | Lasker, III et al. | |
| 5,434,562 A | 7/1995 | Reardon | |
| 5,437,553 A | 8/1995 | Collins et al. | |
| 5,437,555 A | 8/1995 | Ziv-El | |
| 5,441,415 A | 8/1995 | Lee et al. | |
| 5,458,494 A | 10/1995 | Krohn et al. | |
| 5,494,444 A | 2/1996 | Thayer et al. | |
| 5,506,984 A | 4/1996 | Miller | |
| 5,535,422 A | 7/1996 | Chiang et al. | |
| 5,546,598 A | 8/1996 | Yamaguchi et al. | |
| 5,577,188 A | 11/1996 | Zhu | |
| 5,577,919 A * | 11/1996 | Collins et al. | 434/322 |
| 5,592,375 A | 1/1997 | Bardwell et al. | |
| 5,597,312 A * | 1/1997 | Bloom et al. | 434/362 |
| 5,616,033 A * | 4/1997 | Kerwin | 434/118 |
| 5,618,182 A | 4/1997 | Thomas | |
| 5,657,256 A | 8/1997 | Swanson et al. | |
| 5,681,170 A | 10/1997 | Rieber et al. | |
| 5,692,906 A | 12/1997 | Corder | |
| 5,724,987 A | 3/1998 | Gevins et al. | |
| 5,727,950 A | 3/1998 | Cook et al. | |
| 5,730,604 A | 3/1998 | Jay et al. | |
| 5,738,527 A | 4/1998 | Lundberg | |
| 5,743,743 A | 4/1998 | Ho et al. | |
| 5,754,939 A | 5/1998 | Herz et al. | |
| 5,758,079 A | 5/1998 | Ludwig et al. | |
| 5,758,324 A | 5/1998 | Hartman et al. | |
| 5,767,897 A | 6/1998 | Howell | |
| 5,788,504 A | 8/1998 | Rice et al. | |
| 5,788,508 A * | 8/1998 | Lee et al. | 434/350 |
| 5,794,001 A | 8/1998 | Malone et al. | |
| 5,794,178 A | 8/1998 | Caid et al. | |
| 5,794,207 A | 8/1998 | Walker et al. | |
| 5,794,210 A | 8/1998 | Goldhaber et al. | |
| 5,797,753 A | 8/1998 | Griswold et al. | |
| 5,797,754 A | 8/1998 | Griswold et al. | |
| 5,799,292 A | 8/1998 | Hekmatpour | |
| 5,799,315 A | 8/1998 | Rainey et al. | |
| 5,807,114 A | 9/1998 | Hodges et al. | |
| 5,809,493 A | 9/1998 | Ahamed et al. | |
| 5,810,605 A * | 9/1998 | Siefert | 434/362 |
| 5,820,386 A | 10/1998 | Sheppard, II | |
| 5,823,781 A | 10/1998 | Hitchcock et al. | |
| 5,829,983 A | 11/1998 | Koyama et al. | |
| 5,832,497 A | 11/1998 | Taylor | |
| RE36,028 E | 1/1999 | Deesen et al. | |
| 5,862,325 A | 1/1999 | Reed et al. | |
| 5,867,799 A | 2/1999 | Lang et al. | |
| 5,879,165 A | 3/1999 | Brunkow et al. | |
| 5,880,731 A | 3/1999 | Liles et al. | |
| 5,884,270 A | 3/1999 | Walker et al. | |
| 5,892,900 A | 4/1999 | Ginter et al. | |
| 5,896,128 A | 4/1999 | Boyer | |
| 5,904,485 A * | 5/1999 | Siefert | 434/322 |
| 5,907,831 A | 5/1999 | Lotvin et al. | |
| 5,920,861 A | 7/1999 | Hall et al. | |
| 5,957,699 A | 9/1999 | Peterson et al. | |
| 5,978,768 A | 11/1999 | McGovern et al. | |
| 5,987,302 A | 11/1999 | Driscoll et al. | |
| 5,999,908 A | 12/1999 | Abelow | |
| 6,006,191 A | 12/1999 | DiRienzo | |
| 6,024,577 A | 2/2000 | Wadahama et al. | |
| 6,031,577 A | 2/2000 | Ozkan et al. | |
| 6,033,226 A | 3/2000 | Bullen | |
| 6,034,652 A | 3/2000 | Freiberger et al. | 715/730 |
| 6,039,575 A * | 3/2000 | L'Allier et al. | 434/323 |
| 6,041,311 A | 3/2000 | Chislenko et al. | |
| 6,053,739 A | 4/2000 | Stewart et al. | |
| 6,077,085 A | 6/2000 | Parry et al. | |
| 6,099,320 A | 8/2000 | Papadopoulos | |
| 6,119,097 A | 9/2000 | Ibarra | |
| 6,139,330 A | 10/2000 | Ho et al. | |
| 6,141,529 A | 10/2000 | Remschel | |
| 6,146,148 A | 11/2000 | Stuppy | |
| 6,157,808 A | 12/2000 | Hollingsworth | |
| 6,162,060 A | 12/2000 | Richard et al. | |
| 6,186,794 B1 | 2/2001 | Brown et al. | |
| 6,190,178 B1 | 2/2001 | Oh | |
| 6,233,600 B1 | 5/2001 | Salas et al. | |
| 6,282,630 B1 | 8/2001 | Nguyen et al. | |
| 6,292,830 B1 | 9/2001 | Taylor et al. | |
| 6,301,462 B1 | 10/2001 | Freeman et al. | |
| 6,336,813 B1 * | 1/2002 | Siefert | 434/322 |
| 6,386,883 B2 * | 5/2002 | Siefert | 434/322 |
| 6,396,954 B1 | 5/2002 | Kondo | |
| 6,419,496 B1 * | 7/2002 | Vaughan, Jr. | 434/322 |
| 6,471,521 B1 | 10/2002 | Dornbush et al. | |
| 6,665,835 B1 | 12/2003 | Gutfreund et al. | |
| 2001/0011280 A1 | 8/2001 | Gilbert et al. | |

(56) References Cited

U.S. PATENT DOCUMENTS

| | | | | |
|---|---|---|---|---|
| 2001/0018178 | A1* | 8/2001 | Siefert | 434/322 |
| 2001/0037376 | A1 | 11/2001 | Ullman et al. | |
| 2001/0055749 | A1* | 12/2001 | Siefert | 434/322 |

FOREIGN PATENT DOCUMENTS

| | | |
|---|---|---|
| JP | 08196741 | 8/1996 |
| WO | WO 96/39668 | 12/1996 |
| WO | WO 98/30965 | 7/1998 |
| WO | WO 99/54835 | 10/1999 |

OTHER PUBLICATIONS

Navy CMI System, pp. 1-12.
An online prescription for basic skills, by Lois S. Wilson, Training & Development Journal, Apr. 1990, pp. 36-41.
Calos: An experiment with computer-aided learning for operating systems, Murray W. Goldberg, SiGCSE, Feb. 1996, pp. 175, 177,179.
WebCT and first year: student reaction to and use of a web-based resource in first year computer science, Murray W. Goldberg, ITiCSE, 1997, pp. 127, 129.
Welcome! Getting started with WebCT, last modified Sep. 16, 1997, http://www.eduworks.com/victor/New%20Prior%20Art/WebCT/Getting%20Started%20w . . . , downloaded Feb. 17, 2005, pp. 1-10.
Online educational delivery applications/Tools for WebCT, last updated Aug. 26, 1997, http://www.eduworks.com/victor/New%20Prior%20Art/WebCT/On-Line%20Educational . . . , downloaded Feb. 17, 2005, pp. 1-4.
General Overview, last modified Jul. 13, 1997, http://www.eduworks.cotn/victor/New%20Prior%20Art/QuestWriter/GenOver.h . . . , downloaded Feb. 15, 2005, pp. 1-3.
QuestWriter Features, last modified Aug. 12, 1997, http://www.eduworks.com/vicotr/New%20Prior%20Art/QuestWriter/QWfeatures.htm, downloaded Feb. 17, 2005, pp. 1-12.
Student's Overview, last modified Jul. 13, 1997, http://www.eduworks.com/victor/New%20Prior%20Art/QuestWriter/StuOver.htm, downloaded Feb. 17, 2005, pp. 1-4.
Programmer's Overview, last modified Jul. 13, 1997, http://www.eudworks.com/victor/New%20Prior%20Art/QuestWriter/ProgOver . . . , downloaded Feb. 15, 2005, p. 1.
List of QuestWriter Files, last modified Jul. 14, 1997, http://www.eduworks.com/victor/New%20Prior%20Art/QuestWriter/file_list.htm, downloaded Feb. 15, 2005, pp. 1-4.
Quiz Application, last modified Jul. 13, 1997, http://www.eduworks.com/victor/New%20Prior%20Art/QuestWriter/quizapp.htm, downloaded Feb. 17, 2005, pp. 1-3.
Class Gradebook, last modified Jul. 14, 1997, http://www.eduworks.com/victor/New%20Prior%20Art/QuestWriter/cgrade.htm, downloaded Feb. 15, 2005, pp. 1-7.
Conditional Links, last modified Jul. 14, 1997, http://www.eduworks.com/victor/New%20Prior%20Art/QuestWriter/clink.htm, downloaded Feb. 15, 2005, pp. 1-4.
The Registration Page, last modified Jul. 14, 1997, http://www.eduworks.com/victor/New%20Prior%20Art/QuestWriter/registration.htm, downloaded Feb. 17, 2005, pp. 1-4.
Class Library, last modified Jul. 13, 1997, http://www.eduworks.com/victor/New%20Prior%20Art/QuestWriter/classlib.htm, downloaded Feb. 17, 2005, pp. 1-2.
QuestWriter System Page, http://www.eduworks.com/victor/New%20Prior%20Art/QuestWriter/QuestWriter%20 Syste . . . , downloaded Feb. 17, 2005, p. 1.
QuestWriter Mailing list Documentation, http://www.eduworks.com/victor/New%20Prior%20Art/QuestWriter/Mailing%2 . . . , downloaded Feb. 15, 2005, p. 1.
Administrator's Overview, last modified Jul. 13, 1997, http://www.eduworks.com/victor/New%20Prior%20Art/QuestWriter/AdOver.htm, downloaded Feb. 17, 2005, pp. 1-2.
QW admin Documentation, http://www.eduworks.com/victor/New%20Prior%20Art/QuestWriter/QW%20admin% D . . . , downloaded Feb. 17, 2005, pp. 1-2.
Glimpse-Http Documentation, http://www.eduworks.com/victor/New%20Prior%20Art/QuestWriter/Glimpse-H . . . , downloaded Feb. 15, 2005, p. 1-2.
List of Classes, copyright 1996, http://www.eduworks.com/victor/New%20Prior%20Art/QuestWriter/QuestWriter%20 Clas . . . , downloaded Feb. 17, 2005, pp. 1-4.
IQ mailing lists requests, http://www.eduworks.com/victor/New%20Prior%20Art/QuestWriter/IQ%20mai . . . , downloaded Feb. 15, 2005, p. 1.
Welcome to CalculusQuest, last modified Sep. 24, 1997, http://www.eduworks.com/victor/New%20Prior%20Art/QuestWriter/CalculusQ . . . , downloaded Feb. 15, 2005, p. 1.
CalculusQuest Technological Infrastructure, http://www.eduworks.com/victor/New%20Prior%20Art/QuestWriter/Technological%20In . . . , downloaded Feb. 17, 2005, p. 1.
CalculusQuest Features, http://www.eduworks.com/victor/New%20Prior%20Art/QuestWriter/Features.h . . . , downloaded Feb. 15, 2005, p. l.
CalculusQuest Pedagogical Principles, http://www.eduworks.com/victor/New%20Prior%20Art/QuestWriter/Pedagogic . . . , downloaded Feb. 15, 2005, p. 1.
Objectives, http://www.eduworks.com/victor/New%20Prior%20Art/QuestWriter/CQ-Object . . . , downloaded Feb. 15, 2005, p. 1-2.
HyperNews Documentation, http://www.eduworks.com/victor/New%20Prior%20Art/QuestWriter/HyperNew . . . , downloaded Feb. 15, 2005, p. 1.
Welcome to HyperNews, http://www.eduworks.com/victor/New%20Prior%20Art/QuestWriter/HyperNew . . . , downloaded Feb. 15, 2005, p. 1-6.
Overview, last modified Jul. 14, 1997, http://www.eduworks.com/victor/New%20Prior%20Art/QuestWriter/viewlog.htm, downloaded Feb. 17, 2005, pp. 1-7.
Permissions, last modified Jul. 14, 1997, http://www.eduworks.com/victor/New%20Prior%20Art/QuestWriter/permissio . . . , downloaded Feb. 15, 2005, p. 1.
QuestWriter History & Future, last modified Aug. 12, 1997, http://www.eduworks.com/victor/New%20Prior%20Art/QuestWriter/history.htm, downloaded Feb. 15, 2005.p. 1-2.
The Massgrade Tool, last modified Jul. 14, 1997, http://www.eduworks.com/victor/New%20Prior%20Art/QuestWriter/massgrade.htm, downloaded Feb. 17, 2005, p. 1.
QuestWriter Installation, last modified Aug. 12, 1997, http://www.eduworks.com/victor/New%20Prior%20Art/QuestWriter/install.htm, downloaded Feb. 15, 2005, pp. 1-3.
Real Audio Documentation, http://www.eduworks.com/victor/New%20Prior%Art/QuestWriter/Real%20Audio%20 . . . , downloaded Feb. 17, 2005, p. 1.
Instructions for the Stage 7 Communication Activity, copyright 1996, 1989, http://www.eduworks.com/victor/New%20Prior%20Art/QuestWriter/Example%20from%, downloaded Feb. 17, 2005, pp. 1-2.
Communication Activity #5001, copyright 1996, 1989, http://www.eduworks.com/victor/New%20Prior%20Art/QuestWriter/Typical%20results%, downloaded Feb. 17, 2005, pp. 1-3.
Pedagogic innovation in web-based instruction, Bogley et al., http://www.eduworks.com/victor/New%20Prior%20Art/QuestWriter/PEDOGOG . . . , downloaded Feb. 15, 2005, pp. 1-5.
Evaluating Web-based virtual courses: research results and implications, by Scott Chadwick, Distance Education: Designing for success conference—Seattle, Washington, Apr. 1997, pp. 1-4.
Enhancing teaching using the Internet: report of the working group on the World Wide Web as an interactive teaching resource, by Hartley et al., Integrating Tech. into C.S.E., Jun. 1996, pp. 218-228.
Adoption and use of a computer-mediated communication system by contact north site coordinators, by Sweet et al., Journal of Distance Education 1991, pp. 1-10.
Educational MUDs, MOOs, and MUSEs, by Odvard Egil Dyrli, Technology & Learning May/Jun. 1996, p. 20.
The tutor language, Bruce Arne Sherwood, 1977.

(56) References Cited

OTHER PUBLICATIONS

ILINC Executive Briefing. Shrinking distances, improving results. Distance learning with LearnLinc I-Net, by Wilson et al. copyright 1997, http://www.eduworks.com/victor/PICs_Final/Documentation/LearnLinc/ILINC_Executive . . . , downloaded Feb. 17, 2005, pp. 1-6.
LearnLinc LAN/WAN—the first virtual classroom, by Interactive Learning International Corporation, copyright 1997, http://www.eduworks.com/victor/PICs_Final/Documentation/LearnLinc/LearnLin_LAN- . . . , downloaded Feb. 17, 2005, pp. 1-3.
LearnLinc is based on proven interactive learning methodology, by Interactive Learning International Corporation, copyright 1997, http://www.eduworks.com/victor/PICs_Final/Documentation/LearnLinc/LearnLink_files/ . . . , downloaded Feb. 17, 2005, pp. 1-3.
LearnLinc Pro-Net. The Internet virtual classroom with seamless videoconferencing, by Interactive Learning International Corporation, copyright 1997, http://www.eduworks.com/victor/PICs_Final/Documentation/LearnLinc/LearnLinc_Pro-N . . . , downloaded Feb. 17, 2005, pp. 1-3.
Educational applications of computer conferencing, Linda Harasim, Journal of Distance Education, 1986, pp. 1-9.
Using Computes in Human Resources: How to Select and Make the Best Use of Automated HR Systems, by Forrer et al., Jossey-Bass Publishers, San Francisco, 1991.
OnTrack for training: About OnTrack for Training, DKSystems, http://web.archive.org/web/19980203182100/www.dksystems.com/ps-ot-ot.html.
OnTrack for training: Features and benefits, DKSystems, http://web.archive.org/web/19980203183824/www.dksystems.com/ps-ot-ot-features.html, downloaded Oct. 24, 2004, pp. 1-3.
OnTrack for training: Technical Specifications, DKSystems, http://web.archive.org/web/19980203183837/www.dksystems.com/ps-ot-ot-specs.html, downloaded Oct. 24, 2004, pp. 1-3.
OnTrack-ATM: About OnTrack-ATM, DKSystems, http://web.archive.org/web/19980203182113/www.dksystems.com/ps-ot-atm.html, downloaded Oct. 24, 2004, pp. 1-2.
OnTrack-ATM.Net: About OnTrack-Net, DKSystems, http://web.archive.org/web/19980203182011/www.dksystems.com/ps-ot-atmnet.html, downloaded Oct. 24, 2004, p. 1.
OnTrack-ATM.Net: Features and benefits, DKSystems, http://web.archive.org/web/19980203182029/www.dksystems.com/ps-ot-atmnet-features . . . , downloaded Oct. 24, 2004, p. 1-2.
OnTrack-ATM.Net: Technical Specifications, DKSystems, http://web.archive.org/web/19980203182042/www.dksystems.com/ps-ot-atmnet-specs.html, downloaded Oct. 24, 2004, p. 1-2.
OnTrack-ATM.Net: Technical Specifications—Configuration Module, DKSystems, http://web.archive.org/web/19980203182141/www.dksystems.com/ps-ot-atmnet-specs-co . . . , downloaded Oct. 24, 2004, p. 1-3.
OnTrack-ATM.Net: Technical Specifications—Server Module, DKSystems, http://web.archive.org/web/19980203182204/www.dksystems.com/ps-ot-atmnet-specs-se . . . , downloaded Oct. 24, 2004, 2 pages.
OnTrack-ATM.Net: Frequently Asked Questions (FAQs), DKSystems, http://web.archive.org/web/19980203180950/www.dksystems.com/ps-ot-atmnet-faqs.html, downloaded Oct. 24, 2004, p. 1-7.
About Us—Our clients: DKSystems, http://web.archive.org/web/19980203182809/www.dksystems.com/tour-about-client.html, downloaded Oct. 24, 2004, p. 1-2.
DKSystems announces OnTrack for Training API—Allows real-time integration of CBT software with OnTrack for Training by DKSystems, Sep. 26, 1997, pp. 1-2.
Technical Support: OnTrack for Training Service Pack: SP-02/98, DKSystems, http://web.archive.org/web/19980203183622/www.dksystems.com/supt-technical-svcpac . . . , downloaded Oct. 24, 2004, p. 1-4.
Technical Support: Glossary, DKSystems, http://web.archive.org/web/19980203182331/www.dksystems.com/supt-technical-glossar . . . , downloaded Oct. 24, 2004, 31 pages.

Consulting: About DKConsulting services, DKSystems, http://web.archive.org/web/19980203183527/www.dksystems.com/ps-pr-cs.html, downloaded Oct. 24, 2004, p. 1-2.
An evaluation of computer managed instruction in navy technical training,Carson et al., Navy Personnel Research and Development Center, Jun. 1975, pp.v-x, 1-67, 70-81.
Integrated system test of the advanced instructional system, Larry M. Lintz, Air Force Human Resources Laboratory, Dec. 1979, pp. 1-103.
Computer-managed instruction in the navy: I. Research background and status, by Nick Van Matre, Navy Personnel Research and Development Center, Sep. 1980, (p. iii, v, vii, 1-12, A0-A5).
Ingenium, Skill-Driven Training Management Software, Meliora Systems, Inc., last updated Mar. 1, 1997, http://www.eduworks.com/victor/PICs_Final/Documentation/Ingenium/ingeniu . . . , downloaded Feb. 18, 2005, pp. 1-3.
Ingenium press release, Meliora Systems Inc., Dec. 20, 1996, pp. 1-4.
Ingenium Training, Meliora Systems, Inc., last updated Sep. 12, 1997, http://www.eduworks.com/victor/PICs_Final/Documentation/Ingenium/Ingenium 3 Oct . . . , downloaded Mar. 25, 2005, pp. 1-2.
Ingenium: A family of skill-driven training management products. 1997-1998, http://www.eduworks.com/victor/PICs_Final/Documentation/Ingenium/Ingenium_3_Oct_. . . , downloaded Mar. 25, 2005, pp. 1-6.
Frequently asked questions about the product, Meliora Systems, Inc., last updated Sep. 10, 1997, http://www.eduworks.com/victor/PICS_Final/Documentation/Ingenium/Ingenium_3_Oct_. . . , downloaded Mar. 25, 2005, pp. 1-3.
Technical Specifications, Meliora Systems, Inc., last updated Sep. 10, 1997, http://www.eduworks.com/victor/PICS_Final/Documentation/Ingenium/Ingenium_3_Oct_. . . , downloaded Mar. 25, 2005, pp. 1-3.
Ingenium 3.0 Features and Functionality, Meliora Systems, Inc., last updated Sep. 5, 1997, http://www.eduworks.com/victor/PICS_Final/Documentation/Ingenium/Ingenium_3_Oct_. . . , downloaded Mar. 25, 2005, pp. 1-2.
Announcing Ingenium Messenger! last modified Mar. 1, 1997. Meliora Systems, http://www.eduworks.com/victor/PICs_Final/Documentation/lngenium/ingenium_page_A . . . , downloaded Mar. 25, 2005, pp. 1-2.
Ingenium client/server, http://www.eduworks.com/victor/PICs_Final/Documentation/Ingenium/Ingenium_3_Oct_. . . , downloaded Mar. 25, 2005, p. 1.
New software uses latest technology popularity of the Web to take the 'trauma' out of training management, Meliora Systems, http://www.eduworks.com/victor/PICs_Final/Documentation/Ingenium/Ingenium_3_Oct_. . . , downloaded Mar. 25, 2005, pp. 1-3.
Ingenium Web connect technical requirements, http://www.eduworks.com/victor/PICs_Final/Documentation/Ingenium/Ingenium_3_Oct_. . . , downloaded Mar. 25, 2005, p. 1.
New product, http://www.eduworks.com/victor/PICs_Final/Documentation/Ingenium/Ingenium_3_Oct_. . . , downloaded Mar. 25, 2005, p. 1.
Release 3.0 Pricing, Meliora Systems, http://www.eduworks.com/victor/PICs_Final/Documentation/Ingenium/Ingenium_3_Oct_. . . , downloaded Mar. 25, 2005, 2 pages.
Skil-Trak for Windows, Meliora Systems, Inc., 47 slides.
New features for Ingenium 2.0, 10 pages.
The Ingenium Informer, Meliora Systems, The Intelligent Training Management Newsletter, vol. II, No. 2, Spring 1995.
Ingenium Conceptual Terms, Meliora Systems, Inc., 3 pages.
Ingenium Sample learning experiences, Meliora Systems, Inc., 1 page.
Ingenium Student/group membership, Meliora Systems, Inc., 1 page.
Ingenium Facilities & resource management, Meliora Systems, Inc., 1 page.
Ingenium Skills required by group membership, Meliora Systems, Inc., 1 page.
Ingenium Skills & Training required by group membership, Meliora Systems, Inc. 2 pages.
Ingenium Development plan requirements gap, Meliora Systems, Inc., 1 page.

(56) References Cited

OTHER PUBLICATIONS

Ingenium Using rules in the development plan, Meliora Systems, Inc., 14 pages.
Ingenium Future Product Divisions, Meliora Systems, Inc., 52 pages.
Attributes Resume, Meliora Systems, Inc., 3 pages.
Attribute Gap Analysis, Meliora Systems, Inc., 4 pages.
Learning Solutions Catalog, Meliora Systems, Inc., 2 pages.
Learning Solutions Catalog Exceptions, Meliora Systems, Inc., 1 page.
Attribute Inventory Aging by Coach, Meliora Systems, Inc., 1 page.
Attribute Inventory Aging by Highest Percentage 0-90 Days, Meliora Systems, Inc., 1 page.
Attribute Inventory Aging by Employee, Meliora Systems, Inc., 1 page.
MRP Support Doc, Meliora Systems, Inc., 4 pages.
Organization Attribute Summary, Meliora Systems, Inc., 1 page.
Consistency Report by Manager, Meliora Systems, Inc., 1 page.
Consistency Report All IM, Meliora Systems, Inc., 1 page.
Employee List (Alphabetically) Meliora Systems, Inc., 1 page.
Job/Organization Attribute Summary, Meliora Systems, Inc., 4 pages.
Sheet 1, 3 pages.
Flowchart, 1 page.
Ingenium SQL Server Testing Plan, 4 pages.
Teaching through case-based reasoning: an ITS engine applied to business communication, Papagni et al. Proceedings of AI-ED 97 World Conference on Artificial Intelligence in Education,1997, p. 111-118.
Phoenix product overview & quick reference guide, Legent, 6 pages (3rd page has copyright date 1993).
Phoenix for Windows, Pathlore Software Corp, copyright 1996, http://www.eduworks.com/victor/PICs_Final/Documentation/Pathlore_July_1997/Phoenix . . . , downloaded Feb. 17, 2005, pp. 1-3.
Pathlore releases Phoenix Internet and Intranet, Pathlore Software Corporation, Feb. 10, 1997.
Human resource management systems: strategies, tactics and techniques, Ceriello et al., Copyright 1991.
Automate HR Tasks, Training & Development , Oct. 1996, pp. 71-72.
The world's most advanced training management software, Syscom, Inc., copyright 1997, http://www.eduworks.com/victor/PICs_Final/Documentation/TrainingServer_July_1007/ts . . . , downloaded Feb. 17, 2005, pp. 1-2.
Quick Tour, Syscom, Inc., copyright 1997, http://www.eduworks.com/victor/PICs_Final/Documentation/TrainingServer_July_1997/to . . . , downloaded Feb. 17, 2005, pp. 1-2.
Customer support, http://www.eduworks.com/victor/PICs_Final/Documentation/TrainingServer_July_1997/s . . . , downloaded Feb. 17, 2005, pp. 1-2.
Success Stories, http://www.eduworks.com/victor/PICs_Final/Documentation/TrainingServer_July_1997/s . . . , downloaded Feb. 17, 2005, pp. 1-4.
Technical Specifications, http://www.eduworks.com/victor/PICs_Final/Documentation/TrainingServer_July_1997/te . . . , downloaded Feb. 17, 2005.
Comprehensive features, Syscom, Inc., copyrgiht 1997 http://www.eduworks.com/victor/PICs_Final/Documentation/TrainingServer_July_1997/fe . . . , downloaded Feb. 17, 2005, pp. 1-2.
Overview & Brochure, http://www.eduworks.com/victor/PICs_Final/Documentation/TrainingServer_July_1997/b . . . , downloaded Feb. 17, 2005, pp. 1-2.
Universal Self-Service Access, Syscom, Inc., copyright, 1997, http://www.eduworks.com/victor/PICs_Final/Documentation/TrainingServer_July_1997/T . . . , downloaded Feb. 17, 2005, pp. 1-2.
Training TeleServer, http://www.eduworks.com/victor/PICs_Final/Documentation/TrainingServer_July_1997/te . . . , downloaded Feb. 17, 2005, pp. 1-3.
TrainingServer [employee detail], http://www.eduworks.com/victor/PICs_Final/Documentation/TrainingServer_July_1997/self-scr.gif, downloaded Feb. 17, 2005, p. 1.
TrainingServer- [Administrative Documents], http://www.eduworks.com/victor/PICs_Final/Documentation/TrainingServer_July_1997/doc-scr.gif, downloaded Feb. 17, 2005, p. 1.
TrainingServer—[Employee Internal Transcripts] , http://www.eduworks.com/victor/PICs_Final/Documentation/TrainingServer_July_1997/trans-scr.gif, downloaded Feb. 17, 2005, p. 1.
TrainingServer—[Employee Skills], http://www.eduworks.com/victor/PICs_Final/Documentation/TrainingServer_July_1997/skil-scr.gif, downloaded Feb. 17, 2005, p. 1.
TrainingServer—[Employee Job Qualifications/Gap Analysis], http://www.eduworks.com/victor/PICs_Final/Documentation/TrainingServer_July_1997/gap-scr.gif, downloaded Feb. 17, 2005, p. 1.
Event Director —[Schedule of Classes], http://www.eduworks.com/victor/PICs_Final/Documentation/TrainingServer_July_1997/sch-scr.gif, downloaded Feb. 17, 2005, p. 1.
Training Architect—[Course Catalog], http://www.eduworks.com/victor/PICs_Final/Documentation/TrainingServer_July_1997/cat-scr.gif, downloaded Feb. 17, 2005, p. 1.
Partner Directory, http://www.eduworks.com/victor/PICs_Final/Documentation/TrainingServer_July_1997/p . . . , downloaded Feb. 17, 2005, p. 1.
Forum Business Overview, http://www.eduworks.com/victor/PICs_Final/Documentation/TrainingServer_July_1997/f . . . , downloaded Feb. 17, 2005, pp. 1-3.
Personal Computers for Education, Alfred Bork, Harper & Row.
Computerized adaptive testing: a primer, Howard Wainer, Lawrence Erlbaum Associates, Publishers, 1990.
From computer-assisted instruction to intelligent tutoring systems, Norman Livergood, JL of Artificial intelligence in education, vol. 2(3) Spring 1991, pp. 39-50.
Question Mark Professional User Manual, Question Mark Computing Ltd., 1993, pp. Title page i-vii, 1-75 (section 1 to 5.8.3), 149-277 (section 6 to 10.5), 149-183 (section 8 to 9.3), 209-240 (section 10 to 11.2.3), 264-324 (section 12 to appendix B4), 311-346 (appendix C to end of index).
Computer aided instruction for statistics: A knowledge-based systems approach, Prabhu et al., IJCAET vol. 5 No. 1 1995, pp. 3-14.
Cliffs StudyWare, copyright 1993.
Pathway and Pathmaker, Solis, 30 pages, pp. 1-5.
SMART Evaluation: Cognitive Diagnosis, Mastery Learning & Remediation, Valerie Shute, one page (p. 123).
MasteryPOINT Learning Systems Handbook, Applied Learning Systems, Inc., pp. Title page, table of contents, 1-5, 15, 19-28 and 12 other pages with no page numbers.
MasterPOINT Website Design Parameters,pp. 1-10, 7 pages of text and 2 pages of emails.
Scholar/Teach 3, Version 3.1, Users Guide for the IBM-PC, Boeing Computer Services, 1986. (plus 5 pages at the front).
TIMS, A testing information and management system, Chris Daily, pp. 16-18.
Centra Announces Strategic Alliances to Lead Industry Shift Toward Comprehensive Live Web-Based Training Delivery, Centra Software, Feb. 10, 1997, pp. 1-3.
Centra Software ships Symposium 1.0, Centra Software, Jul. 14, 1997, pp. 1-3.
Plaut Consulting Selects Centra's Symposium to Deliver Live Interactive Training to SAP R/3 Users Via the Internet, Centra Software, Aug. 12, 1997, pp. 1-3.
"Centra Software Announces Strategic Partnership With Macromedia to Support Open Standards for Enterprise Learning," Centra Software, Oct. 8, 1997, pp. 1-3.
An Update on Webct (World-Wide-Web Course Tools) A Tool for the Creation of Sophisticated Web-Based Learning Environments, Goldberg et al., Proceedings of NAUWeb '97—Current Practices in Web-Base Course Development, Jun. 12-15, 1997, pp. 1-8.
InterQuest Home Page, last modified Jul. 13, 1997, http://www.eduworks.com/victor/New%20Prior%20Art/QuestWriter/IQHome.htm, downloaded Feb. 15, 2005, pp. 1-2.

(56) References Cited

OTHER PUBLICATIONS

"New Pedagogies and Tools for Web Based Calculus", Proceedings of the AACE WebNet96 Conference, by Bogley et al., Oct. 15-19, 1996, pp. 1-8.
Success Maker Courseware brochure, published by Computer Curriculum Corporation, Dec. 1994.
Active Mind Series, 1996. URL=http://www.broderbund.com/studio/ams.html.
"Logical Journal of the Zoombinis", 1996, URL=http://www.broderbund.com/studio/atoz/zoombini.html.
"Guide to Selecting Software", PC Novice, vol. 3, issue 12, pp. 51, 64 and 89-92.
Computerized Adaptive Testing, Oct. 24, 1994, URL=Gopher://Gopher.ETS.org.
Innovation and Technologies, Oct. 21, 1994, pg. 103. URL=Gopher://Gopher.ETS.org.
Interactive Mathematics Instructor's Guide by Academic Systems, Aug. 1995, pp. 86 and 114.
High School Learning and Resource Library by Pro One, Photocopy of the box and screen-dump to get 5 pages, 1995.
"Computer Based Training—A Report of a NATO Study Visit to America", J. Patrick, AP Report 91, pp. 1-29, Jan. 1980.
"Improving the Selection, Classification, and Utilization of Army Enlisted Personnel: Annual Report Synopsis, 1984 Fiscal Year", pp. v, vii-x and 1-40, Human Resources Research Organization, Alexandria, VA, Jul. 1985.
"Mendel: An Intelligent Computer Tutoring System for Genetics Problem-Solving, Conjecturing, and Understanding", Machine-Mediated Learning, vol. 2, No. 1 & 2 pp. 129-159, Streibel et al, 1987.
"Getting Serious about SAT software", National Council of Teachers of Mathematics, pp. 440-454, Harvey et al., Sep. 1987.
"Control for Intelligent Tutoring Systems: A comparison of Blackboard Architectures and Discourse Management Networks"Machine-Mediated Learning, vol. 3, No. 1, pp. 107-124, W. Murray, 1989.
"Taking a standardized test? Here's some help.", M. Bunescu , 62 Electronic Learning, Sep. 1989, pp. 62-64.
"ECAL: Bridging the Gap Between CAL and Intelligent Tutoring Systems", Elsom-Cook et al., Computers and Education, vol. 15, No. 1-3, 1990, pp. 69-81.
"A Blackboard-Based Dynamic Instructional Planner", W. Murray, Artificial Intelligence Center, FMC Corp., ONR-6376, pp. 1-59, 72-83, 97-103, with 9 introductory pages, Feb. 1990.
Test-taking skills. School library journal, pp. 61, May 1990.
"An Architecture and Methodology for Creating a Domain-Independent, Plan-Based Intelligent Tutoring System", Julita Vassileva, Educational & Training Technology International, vol. 27 #4, Nov. 1990, pp. 386-397.
"Software", Media & Methods, Weiser et al., Nov.-Dec. 1990, pp. 63-64.
"Toward the Design of an Intelligent Courseware Production System Using Software Engineering and Instructional Design Principles." Chen et al., Educational Technology Systems, Dec. 1990, pp. 41-52.
"Advanced Technology Training Program for the Apparel Industry. Final report." Office of Vocational and Adult Education (ED), Washington, DC, 1991, pp. 1-9.
"An Analysis of Computer-Assisted Instruction on Scholastic Aptitude Test Performance of Rural High School Students.", Fine et al., Education, vol. 111, No. 3, Spring 1991, pp. 400-403.
"Building Integrated Skills—A Model for Action." BC Construction industry skills improvement council, 404-737 Carnarvon Street, New Westminster, British Columbia V3M 5X1 Aug. 1991, pp. 1-6.
"Computer Software", Journal of Reading 3517, Herne et al., Apr. 1992, pp. 604.
"Designing a Tool Supporting the Development if ITS in Different Domains: The Docet Experience." Bonarini et al., Interactive Learning Environments, vol. 3, No. 2, 1993, pp. 131-149.
Databases on Vocational Qualifications and Courses Accredited European Centre for the Development of Vocational Training, Berlin (Germany), Feb. 1993, pp. 1-11.
"An Approach to Developing Intelligent Tutors in Mathematics Computers & Education", H. Nwana, vol. 20, No. 1, Mar. 1993, pp. 27-43.
"An Historical Perspective and a Model for Evaluation of Intelligent Tutoring Systems", Seidel et al., J. Educational Computing Research, vol. 10(2) 1994 pp. 103-128.
"A New Direction for Developmental Education Using Technology." Annual Convention of the American Association of Community Colleges (74th, Washington, DC, Apr. 6-9, 1994) Apr. 1994, pp. 1-9.
"Mathematics Study Skills: A Must for Students With LD.: Intervention in School and Cline"/, P. Nolting, vol. 30, #1, Sep. 1994, pp. 53-59.
"Keeping up with the SATs." R. Schneider, Technology and Learning, Sep. 1994, pp. 7-9.
"Using Computer Technology to Monitor Student Progress and Remediate Reading Problems", C. McCullough, School Psychology Review, vol. 24, No. 3, 1995, pp. 426-439.
"Gearing up for the SAT.", R. Schneider, Technology Learning, Jan. 1996, pp. 9-11.
"Basic Skills Program Helps Trainees Pass Vocational Tests" The Technological Horizons in Education Journal vol. 23, No. 8, Mar. 1996, p. 66.
"Foundations of Probability With Applications," Suppes et al., selected papers 1974-1975, Nov. 1996, pp. 149-188.
CBT Wintracs, CBT Systems Ltd., 1994.
Computer-Assisted Instruction at Stanford, 1966-68, Suppes et al., Academic Press, 1972, pp. v-ix and 1-533.
Control Data Plato, System Overview, Paulson, Roger F., Control Data Corporation, 1976.
Control Data Plato, CMI Author's Guide, Jul. 24, 1978.
Control Data Plato, Author Language Reference Manual, Control Data System, Apr. 1978.
CDC Philosophy, Control Data Corporation, 1978.
"A Computerized Model for Placement and Diagnostic Testing in College Remedial Mathematics", Iraj Hirmanpour, A Florida Atlantic University Dissertation, Dec. 1980.
Industry Education Computer Based Training Strategy, Arthur Andersen & Co., Feb. 1988.
Teacher's Handbook for Math Concepts and Skills, Computer Curriculum Corporation, Agulnick et al., 1991, pp. 1-126.
CBT Systems, by the Training Resource, 1992, pp. i-xxiii and 1-51.
CBT Systems, The Training Resource, 1993.
'How to Use the CBT Tracs System, Administrator's Guide, CBT Systems Ltd. 1994, pp. 1-29.
Full Curriculum Software Personal Selection Help, EISI Software Institute, Jan. 1994, pp. 495, 500-503, 511, 517-527, 575-581, 583-585.
CBT Systems by The Training Resource, Spring 1995, pp. 3-256.
"The Development of a Health Careers Database Computer Program", Ava Miller, A University of Houston Dissertation, May, 1995.
"Knowledge Management Case Study", Knowledge Management at Microsoft, 1997, Thomas Davenport, Feb. 1, 1998.
Wintracs, CBT Systems, Ltd., Sep. 1997, pp. 65-97.
Teltech: The Business of Knowledge Management Case Study, Thomas Davenport, www.bus.utexas.edu/kman/telcase.htm., Apr. 1996, pp. 1-9.
SkillView: Engineering a More Productive Work Force, SkillView Technologies, before 2003.
Educational Uses of the PLATO Computer System, Science, Smith et al., vol. 192, No. 4237, Apr. 23, 1976, pp. 344-352.
"The Design and Implementation of a Dynamically Tailored Examination," Lawrence Whitlock, SIGSCE Bulletin, vol. 9, No. 3, Lawrence Whitlock, pp. 59-62.
"Computer Assisted Diagnostic Prescriptive Program in Reading and Mathematics", Robertson et al., US Dept. of Education, Washington, D. C., Jan. 1986.
"The New Component Design Theory: Instructional Design for Courseware Authoring", D. Merrill, Instructional Science 16: 19-34, 1987.
Teacher's Handbook for English as a Second Language, Computer Curriculum Corporation, Feb. 1985.
The CCC Instructional System, Jul. 1990.
CCC Graphics Server, Preliminary Information for Proctors, Jul. 17, 1987.

(56) References Cited

OTHER PUBLICATIONS

"Important Information on Speech System Use for Release 12 Courses", Barbara Tingey, Mar. 22, 1988.
CCC Graphics Server, Product description, May 1987.
Teacher's Handbook for Initial Reading, Computer Curriculum Corporation, Jul. 1988.
Interoffice Memorandum, MAC Platform News, D. Salvadori, Mar. 19, 1991.
Marketing Reference Manual.
An Overview of the CCC Instructional System on the IBM PS/2, Computer Curriculum Corporation, Jan. 1991.
Marketing Reference Manual, System Planning.
Marketing Reference Manual, Questions and Answers.
"William C. Norris: Portrait of a Maverick", Worthy et al., Ballinger Publishing Company, 1987.
"The Well-Managed Classroom, Teaching and Computers", Bobby Goodson, Nov.-Dec. 1988.
EPIE Report Summary for Computer Curriculum Corporation, Apr. 1990.
Introducing The Newest Member of CCC's Winning Team, Computer Curriculum Corporation.
The Intelligent Design of Computer-Assisted Instruction, Chapter 9: Algorithms For Student Assessment: Formalizing instruction evaluation, Venezky et al., Published by Longman, 1991, pp. 165-189.
"Computer Managed Instruction at Arthur Andersen & Company: A Status Report", Dennis et al., Educational Technology, Mar. 1992, p. 7-16.
2.0 CMI Overview, CMI Guidelines AICC, Oct. 25, 1993, p. 1-22.
"Performance Support Systems: Integrating AI, Hypermedia, and CBT to enhance user performance", Karen McGraw, Jl. of Artificial Intelligence in Education (1994) 5(1), 1994, 3-26.
"The Use of Pre-Test and Post-Test in Call: A Case Study", Blini et al. Computers Educ. vol. 23, No. 1/2 , 1994, pp. 143-150.
CMI Guidelines for Interoperability, AICC, Jan. 26, 1996.
CBT Campus Tour Preview, CBT System, 1997.
Web-Based Training Cookbook, Wiley Computer Publishing, Brandon Hall, 1997.
Training Multimedia, How to Manage Benchmark Multimedia Based Training, vol. 3, #1, 1997.
DigitalThink: "A Classroom on the Web, New Media", Paul Williams, May 5, 1997.
"Netting on Education", Laura Castaneda, San Francisco Chronicle, Business, Jul. 24, 1997.
Knowledge Inc., vol. 2, No. 8, Aug. 1997.
Computer Managed Instruction, AICC Guidelines and Recommendations, AICC, Feb. 1, 1997.
"Hands on: Java Tutorials", Ned Snell, Insider Technology Training, Nov. 1997.
Implementation Strategies for Web-Based Training and Performance Support by International Quality & Productivity Center, Nov. 17-19, 1997.
"Keeping Track", Sarah Auerbach, Inside Technology Training, Jul.-Aug. 1998.
"Plato Rising: Online learning for Atarians", Small et al., www.atarimagazines.com/v3n3/platorising.html, Apr. 25, 2003.
"Free-Body Diagrams (a Plato Lesson)", Bruce Arne Sherwood, published in the American Journal of Physics, vol. 39, Nos. 1-12, Oct. 1971, pp. 1199-1203.
"The use of computers in the teaching of Chemistry", Smith et al., Journal of Chemical Education, vol. 51, No. 4, Apr. 1974 pp. 243-244.
CBT Campus Administrator's Guide, Version 1.01., CBT Systems Ltd., Mar. 1998, pp. 6-10, 25, 26, 31-34, 37, 38, 61, 62, 77-84, 87, 88 and 127-166.
Cliffs StudyWare for the GED, pp. 1-44, with 4 introductory pages, Cliffs Notes, Inc., 1994.
Telematic applications project TE2003: CoopWWW, Interoperable Tools for Cooperation support using the World Wide Web, Project Intelligence Report; pp. 1-31; by Mattias Hallstrom, Jul./Aug. 1997.
CyberProf —An intelligent human-computer interface for interactive instruction on the World Wide Web; JALN vol. 1, Issue 2; pp. 20-37; by Raineri et al., Aug 1997.
"Plug-in" for more active online learning; Multimedia Schools; vol. 4, Issue 3; pp. 1-8; by Tuttle, Harry G., May/Jun. 1997.
Internet relay chat protocol; Network Working Group, Request for comments: 1459; pp. 1-65; by Oikarinen et al., May 1993.
Computer aided learning and instruction in science and engineering; Third International Conference, CALISCE '96; Lecture Notes in Computer Science 1108; cover sheet, pp. I-XIV, pp. 1-480, 3 pages at the end; by Sanchez et al., Jul. 29-31, 1996.
NAEP Validity studies: feasibility studies of two-stage testing in large-scale educational assessment: Implications for NAEP; National center for education statistics, working paper No. 2003-14; U.S. Department of Education, Institute of Education Sciences; 7 introductory pages, pp. 1-52, and 17 pages of listing; by Bohrnstedt et al., Apr. 2003.
"Software and Courseware", The Technological Horizons in Education Journal vol. 22, No. 10, May 1995, p. 41.
"SAT Preparation Through Technology", Bean et al., Media & Methods, Nov.-Dec. 1996, p. 73.
"Computers in School: A Loser? or a Lost Opportunity?", Shao et al., Business Week, No. 3115, Jul. 17, 1989, p. 108, 3 pages total.
"Is it a 'Miracle'? Computer Teaches Piano" Consumer Reports, V. 56, No. 11, Nov. 1991, p. 718, 2 pages total.
"Kids Love to Learn With These PC Games", Warner et al., Business Week, No. 3265, May 11, 1992, p. 116, 2 pages total.
"Software That's Fun and Educational—That's 'Edutainment'", C. Miller, American Marketing Association, Marketing News, Apr. 26, 1993, p. 2. 2 pages total.
"Test Drive; Comic Relief Helps Navigate Hallways of 'Inside the SAT'", E. Granger, St. Louis Post-Dispatch, Everyday magazine, Mar. 1995, p. 1F, 2 pages total.
"SAT FUNdamentals", D. Oldenburg, The Washington Post, Final Edition, Apr. 7, 1995, p. D05, 2 pages total.
"SAT Software: Does it work?", R. Calem, The New York Times, Section C, Late Edition—Final, Apr. 27, 1995, p. 2, col. 1, 3 pages total.
"CD-ROM Helps Prepare for Sat", J. Gaw, The Plain Dealer, May 8, 1995, Final/All, Section: Next, p. 1E, 2 pages total.
"Kaplan Preps for CD-ROM Release", HFN, vol. 69, No. 32, Aug. 7, 1995, p. 67, 2 pages total.
"Turning SATS Into a Kind of Video Game", M. Putzel, The Boston Globe, Economy, City Edition, Sep. 15, 1995, p. 91, 2 pages total.
"Training the Workers Who Operate the Trains", Butt et al., American Society for Training & Development, Inc, Technical & Skills Training, vol. 6, No. 7, Oct. 1995, pp. 14-19, 4 pages total.
"Computer Tutors to Help You Ace the SAT", Dunkin et al., Business Week, Personal Business, Education, No. 3444, Oct. 2, 1995, p. 142, 2 pages total.
"New CD-Roms Aimed At Reducing SAT Jitters", W. Honan, The Houston Chronicle, Section a, 2 Star Edition, Oct. 8, 1995, p. 6, 2 pages total.
"Test-Preparation Software Scores Big", V. Marino, Los Angeles Times, Business Section, Part D, Financial Desk, Orange County Edition, Nov. 1, 1995, p. 7, 2 pages total.
"Multiple Choice Virtual Tutors Rated Coaching Options Range From Staid Help to High-Tech Glitz", Gannett Company, Inc., USA Today, Mar. 21, 1996, Final Edition, Life Section, Mar. 21, 1996, p. 6D, 3 pages total.
SuccessMaker Reports Quick Reference Guide, Computer Curriculum Corporation, Oct. 1993, pp. i-iii and 1-18, 22 pages total.
SuccessMaker Math Concepts and Skills, Teacher's Handbook, Computer Curriculum Corporation, Feb. 1993, pp. i-iv and 1-163 and 165-167, 170 pages total.
Registrar, Silton-Bookman Systems Inc., 1997, 13 pages total.
Silton-Bookman Systems, Registrar, Sep. 24, 1997, 6 pages total.
CMI Guidelines for Interoperability AICC, Rev. 2, Feb. 1998, pp. i-xiv and 1-58 and 60-283.
"The Off-Line Plato System," Stanley G. Smith, Journal of Chemical Education, vol. 56, No. 12, Dec. 1979, pp. 781-782, cover sheet and 3 pages total.

(56) References Cited

OTHER PUBLICATIONS

Network Operating Systems by CBT Systems Ltd., 1994, cover sheets—2, p. 3, 5, and 10-13, 8 pages total.
www.ibm.com/developerworks/lotus/library/ls-elearning_evolution/, titled, "The evolution of Lotus e-Learning Software" by Elizabeth bowling.
A Convenient Way to Organize and Install PCM 1.2 (and Wintracs) on NT Server, CBT Knowledge Base, Lee Prouty, Jan. 2, 1998, 2 pages.
The Detours Leading to the Discovery of Fission, Journal of Chemical Education, G. L. Breneman, vol. 56, No. 12, Dec. 1979, cover, pp. 781-783.
CMI Guidelines for Interoperability, AICC, Original Release Date of Oct. 25, 1993, Revision 1.6, Release Apr. 25, 1996, pp. i-xii, 1-253.
Computer Recognition of Human Faces, by Takeo Kanade, Interdisciplinary Systems Research, Birkhauser Verlag, Basel und Stuttgart, 1977, cover and 2 additional pages, pp. i-iv, 1-87, 89-91, 93-96, and 2 additonal pages at the end.
Curtis, Pavel, "PlaceWare: From Research to Product Service to Tomorrow," PlaceWare: A Microsoft Company, from Workshop on Advanced Collaboration Environments, Jun. 22, 2003.
Driscoll et al., "The Web as a Learning Environment," IEEE, 1997, pp. 333-338.
Goldberg et al., "World Wide Web—Course Tool: An Environment for Building WWW-Based Courses," Computer Networks and ISDN Systems, vol. 28, issues 7-11, 1996, 14 pgs.
Keeling, Roger, "Education 2010," Newman Software, Research Machines, NCET, Pub. Newman Software, 1989, 83 pgs.
Kellerman et al., "Adaptive Computer Assisted Instruction," http://www.ip.com/pubview/IPCOM000070122D, Feb. 21, 2005, 2 pgs.
Khan, Badrul Huda, "Web-based instruction," University of Texas, Brownsville, Educational Technology Publications, $2^{nd}$ Ed., Feb. 1, 1997, 463 pgs.
Lu et al., "Idea Management in a Shared Drawing Tool," Proceedings of the Second European Conference on Computer-Supported Cooperative Work, Sep. 25-27, 1991, pp. 97-112.
Thommen, John D., "Using Testbanking to Implement Classroom Management/Extension through the Use of Computers," Lansing Community College, Nov. 6, 1992, 6 pgs.
van Merrienboer et al., "Fuzzy Logic Instructional Models: The Dynamic Construction of Programming Assignments in CASCO," Automated Instructional Design: Computer-Based Development and Delivery Tools, Chapter 11, pp. 265-302, Tennyson, R.D., et al. (eds.) © Springer-Verlag Berlin Heildelberg 1995.
Element's Answer to First Amended Complaint for Patent Infringement, C.A. No. 1:11-cv-00825-LPS, filed Nov. 1, 2011, pp. 1-30.
Lawson's Answer to First Amended Complaint for Patent Infringement, C.A. No. 1:11-cv-00825-LPS, filed Nov. 2, 2011, pp. 1-27.
Trivantis' Answer and Counterclaim to Plaintiff's First Amended Complaint for Patent Infringement, C.A. No. 1:11-cv-00825-LPS, filed Nov. 11, 2011, pp. 1-13.
Ultimate's Answer to First Amended Complaint for Patent Infringement, C.A. No. 1:11-cv-00825-LPS, filed Nov. 14, 2011, pp. 1-26.
Pearson's Answer, Affirmative Defenses, and Counterclaims of NCS Pearson, Inc., C.A. No. 1:11-cv-00825-LPS, filed Nov. 28, 2011, pp. 1-21.
Connections' Answer to Plaintiff's First Amended Complaint for Patent Infringement, C.A. No. 1:11-cv-00825-LPS, filed Nov. 28, 2011, pp. 1-19.
Beeline's Answer, Defenses, and Counterclaims to Plaintiff lpLearn's First Amended Complaint, C.A. No. 1:11-cv-00825-LPS, filed Dec. 5, 2011, pp. 1-26.
Cengage's Answer and Counterclaim to Plaintiff's First Amended Complaint for Patent Infringement, C.A. No. 1:11-cv-00825-LPS, filed Dec. 13, 2011, pp. 1-10.
Kenexa's Answer to First Amended Complaint and Counterclaims, C.A. No. 1:11-cv-00825-LPS, filed Jan. 5, 2012, pp. 1-19.
Halogen's Answer and Counterclaim to Plaintiff's First Amended Complaint, C.A. No. 1:11-cv-00825-LPS, filed Jan. 19, 2012, pp. 1-27.

Mzinga's Answer and Counterclaim to Plaintiff's First Amended Complaint, C.A. No. 1:11-cv-00825-LPS, filed Jan. 19, 2012, pp. 1-27.
Operitel's Answer, Affirmative Defenses, and Counterclaims to Plaintiff lpLearn, LLC's First Amended Complaint for Patent Infringement, C.A. No. 1:11-cv-00825-LPS, filed Feb. 3, 2012, pp. 1-26.
Technomedia's Answer and Counterclaims to Plaintiff's First Amended Complaint, C.A. No. 1:11-cv-00825-LPS, filed Feb. 14, 2012, pp. 1-28.
Oracle's Answer to First Amended Complaint for Patent infringement, C.A. No. 1:11-cv-00825-RGA, filed Jul. 16, 2012, pp. 1-20.
K12's Answer to lpLearn's First Amended Complaint, C.A. No. 1:11-cv-01026-RGA, filed Jul. 16, 2012, pp. 1-10.
Blackboard's Answer to Plaintiff's Complaint for Patent Infringement, Affirmative Defenses and Counterclaims, C.A. No. 1:11-cv-00876-LPS, filed Nov. 21, 2011, pp. 1-18.
AICC Guidelines and Recommendations, White Papers, and Working Papers, documents taken from www.aicc.org through Dec. 21, 1998: AICC Guidelines and Recommendations, AGR-001, version 1.0, "AICC Publications," *allegedly dated*Oct. 1, 1994, 6 pages.
AICC Guidelines and Recommendations, AGR-002, version 7.0, "Courseware Delivery Stations: Hardware," *allegedly dated*Jan. 14, 1998, 5 pages.
AICC Guidelines and Recommendations, AGR-003, version 2.0, "Digital Audio," *allegedly dated*Jan. 9, 1997, 4 pages.
AICC Guidelines and Recommendations, AGR-004, version 4.0, "Courseware Delivery Stations: Software," *allegedly dated*Mar. 27, 1996, 6 pages.
AICC Guidelines and Recommendations, AGR-005, version 1.0, "CBT Peripheral Devices," *allegedly dated*Nov. 11, 1992, 4 pages.
AICC Guidelines and Recommendations, AGR-006, version 2.0, "Computer Managed Instruction," *allegedly dated*May 19, 1998, 5 pages.
AICC Guidelines and Recommendations, AGR-007, version 1.0, "Courseware Interchange," *allegedly dated*Aug. 29, 1995, 3 pages.
AICC Guidelines and Recommendations, AGR-008, version 1.0, "Digital Video," *allegedly dated*Aug. 29, 1995, 3 pages.
AICC Guidelines and Recommendations, AGR-009, version 1.0, "Icon Standards: User Interface," *allegedly dated*Jun. 13, 1996, 4 pages.
AICC Document, AUD001-A, "Plug & Play Guidelines for AICC CBT Drivers," *allegedly dated*Mar. 18, 1992, 23 pages.
AICC Document, AUD002/AUD002A/AUD002B (compiled), "Digital Audio Portability Guidelines AICC," *allegedly dated*May 3, 1998, 93 pages.
AICC Document, AUD003, "AICC Extensions to the IMA Recommended Practices," *allegedly dated*May 3, 1998, 20 pages.
AICC Document, CMI003, "AICC/CMI Certificate Testing Procedures Signature Page," version 1.0a, *date unknown*, 1 page.
AICC Document, CMI001, "CMI Guidelines for Interoperability AICC," *allegedly dated*Jun. 18, 1998, 310 pages.
AICC Document, CMI003, "AICC/CMI Certification Testing Procedures," *allegedly dated*Sep. 24, 1998, 118 pages.
AICC Document, CMI004, "AICC/CMI Assignable Unit (AU) Proxy Design Guidelines," *allegedly dated*Jun. 24, 1998, 15 pages.
AICC Document, CMI005, "Handling Objectives in the AICC CMI Guidelines," *allegedly dated*Jul. 6, 1998, 26 pages.
AICC Document, CMI006, "Levels of CMI Compliance Supplement to AICC CMI Guidelines," *allegedly dated*Jun. 24, 1998, 20 pages.
AICC Document, CMI007, "Web Launch Scenario for the AICC CMI Guidelines," *allegedly dated*Jul. 2, 1998, 15 pages.
AICC Document, COM002, "Documentation Guidelines for AICC non-AGR-Publications," *allegedly dated*Sep. 11, 1992, 54 pages.
AICC Document, CRS002, "Glossary of Terms Related to Computer-Based Training," *allegedly dated*Jan. 31, 1997, 125 pages.
AICC Document, CRS003, "Hierarchy of CBT Terms for AICC Publications," *allegedly dated*Dec. 17, 1992, 15 pages.
AICC Document, CRS004, "Guidelines for CBT Courseware Interchange," *allegedly dated*Oct. 31, 1995, 41 pages.
AICC Document, CRS005, "Bitmap Graphic File Format: An AICC White Paper," *allegedly dated*Jun. 17, 1998, 10 pages.

(56) References Cited

OTHER PUBLICATIONS

AICC Document, CRS006, "Distance Learning Technology for Aviation Training," *allegedly dated*Jun. 24, 1997, 48 pages.
AICC Document, ELS001, "Digital Electronic Library System: An AICC White Paper," *allegedly dated*May 1998, 34 pages.
AICC Document, MPD005, "Part Task Trainer Interfacing," *allegedly dated*Jun. 17, 1994, 12 pages.
AICC Document, MPD006, "AICC Audio and the Migration to Windows: An AICC White Paper," *allegedly dated*Jun. 20, 1994, 6 pages.
AICC Document, MPD010/MPD004, "Simulation Interoperability," *allegedly dated*May 19, 1995, 113 pages.
AICC Document, MPD011, "The Use of Digital Video in Computer Based Training," *allegedly dated*Apr. 5, 1995, 30 pages.
AICC Document, "Draft AICC White Paper: CBT Design and Development Recommendations for Users of AICC CMI Systems," *allegedly dated*Jun. 17, 1998, 5 pages.
AICC Document (*alleged*) "Graphic Library Specification," version 1.01.0, *allegedly dated*Jan. 6, 1998, 15 pages.
AICC Document (*alleged*) "P_Code Specification," version 1.01.0, *allegedly dated*May 28, 1998, 13 pages.
AICC Document (*alleged*) "T_Code Specification," version 1.01.0, *allegedly dated*May 26, 1998, 9 pages.
AICC Document (*alleged*) "SMGGen Specifications," version 2.01, *allegedly dated*Dec., 22, 1998, 28 pages.
Hollingsworth, Gerald, Etude Version 2.0 User Guide, *date unknown*, 91 pages.
Etude™ 3.1 Requirements Analysis, *date unknown*, 96 pages.
Hollingsworth, Gerald T. "Etude® Methodology: The Process for Training Design, Qualification Maintenance and Employee Development," GPU Nuclear Training Services Group, © 1996 GPU Nuclear, GPU Corp., 22 pages.
Hollingsworth, Gerald T. "Etude™ Training Program Module I: (Introduction to Processes)," GPU Nuclear Training Services Group, *allegedly dated*1997, 35 pages.
Hollingsworth, Gerald T. "Etude™ Training Program Module II: Scheduling Processes," © 1997 GPU Nuclear, Inc., 15 pages.
Hollingsworth, Gerald T. "Etude™ Training Program Module III: Employee Qualification Documentation," GPU Nuclear Training Services Group, *allegedly dated*1997, 8 pages.
Hollingsworth, Gerald T. "Etude™ Training Program: Module IV: Training System Design Functions," GPU Nuclear Training Services Group, © 1997 GPU Nuclear, Inc., Cover Page and pp. 1-9.
Hollingsworth, Gerald T. "Etude™ Training Program: Module V: Evaluations and Exam Building," GPU Nuclear Services Group, *allegedly dated*1997, Cover Page and pp. 1-5.
New Features for Ingenium 2.0, *date unknown*, 13 pages.
Ingenium 3.0 User's Guide, Meliora Systems, Inc. © 1993-1997 Meliora Systems, Inc., 413 pages.
Ingenium™ for Windows™ The Intelligent Training Management Software, Meliora Systems, Inc., *allegedly dated*Oct. 31, 1996, 1 page.
Ingenium™ for Windows™ Getting Started & Tutorial Guide, © 1995 Meliora Systems, Inc., 162 pages.
Ingenium Messenger™ 3.0 Manual, © 1997 Meliora Systems, Inc., 166 pages.
"Announcing Ingenium Messenger," Meliora Systems, Inc., *allegedly dated*Dec. 20, 1996, updated Sep. 10, 1997, 2 pages.
Ingenium™ : Ingenium Reports Guide, © 1997 Meliora Systems, Inc., 105 pages.
System Administration Guide Ingenium 3.0, © 1993-1997 by Meliora Systems, Inc., 181 pages.
Blease, Derek, *Evaluating Educational Software*, © 1986 Derek Blease, Croon Helm Ltd., 154 pages.
Squires, D., et al. *Choosing and Using Educational Software: A Teachers' Guide*, © 1994 D. Squires and A. McDougall, The Falmer Press, 175 pages.
Schank, R.C., et al. *Engines for Education*, © 1995 Lawrence Erlbaum Associates, Inc., 248 pages.
Highlights of the 1996 AERA Annual Meeting, Educational Researcher, v. 25, Jun. 1, 1996, http://edr.sagepub.com/content/25/5/16.citation, Publication Page and pp. 16-17.
1996 AERA Annual Meeting Highlights New York, Apr. 8-12, Educational Researcher, v. 25, Jan. 1, 1996, http://edr.sagepub.com/content/25/1/37.citation, Publication Page and pp. 37-38.
ACT, copyright *allegedly dated*1995 (1 CD).
Kaplan, copyright *allegedly dated*1995 (1 CD).
LOIS and LOIS Demo by KnowledgeSoft *allegedly dated*Jun. 26, 1997 (1 CD).
LOIS: Trade Show Attract Loop by KnowledgeSoft, *allegedly dated*Sep. 1996 (1 DVD).
Registrar, copyright date either unknown or *allegedly dated*no earlier than 2000 (1 DVD).
"CPSC 315 WebCT Tool Page," http://www.cs.ubc.ca/wccce/program97/murray/toolpage1.gif, *date unknown*, 1 pg.
CS Dept. NSF-Supported Education Infrastructure Project/ei.cs.vt.edu, Virginia Polytechnic Institute and State University, *date unknown*, 1 pg.
Edelson, D.C. et al., "Teachers as Seekers of Understanding: Technological Support for a Partnership between Teachers and Students," presented at AERA, New York, NY, 1996, 27 pgs.
Goldberg, M.W. et al. "An Update on WebCT (World-Wide-Web Course Tools)—A Tool for the Creation of Sophisticated Web-Based Learning Environments," Proceedings of NAUWeb'97—Current Practices in Web-Based Course Development, Jun. 12-15, 1997, http://www.cs.ubc.ca/wccce/program97/murray/murray.html, 13 pgs.
Harasim, L., et al. *Learning Networks: A Field Guide to Teaching and Learning Online*© 1995 The MIT Press, Fifth printing 2001, 334 pgs.
Hollingsworth, Gerald, Etude Version 2.0 User Guide, allegedly dated Jun. 1997, 93 pgs.
Moore, J. et al. "Computer-Aided Instruction with Microcomputers: Part 1, Systems and applications," *Journal of Chemical Education*, v. 56, No. 12, Dec. 1979, pp. 776-783.
PLATO User's Guide, Rev. C, © 1974, 1975, 1976, 1981 Control Data Corporation, 273 pgs.
Quizit results, *date unknown*, 2 pgs.
Reakes, Dr. Michael, "Management of Integrated Training Systems," from Proceedings of the IEEE 1990 National Aerospace and Electronics Conference, pp. 924-928, vol. 2, May 21-25, 1990, IEEE Explore, © 2012, 6 pgs.
Tinoco, Lucio Cunha, "Online Evaluation in WWW-based Courseware: The Quizit System," MS Thesis, Virginia Polytechnic Institute and State University, Jan. 20, 1996, 87 pgs.
Part 1: Wenger, Etienne, *Artificial Intelligence and Tutoring Systems: Computational and Cognitive Approaches to the Communication of Knowledge*, © 1987 Morgan Kaufmann Publishers, Inc., 245 pgs.
Part 2: Wenger, Etienne, *Artificial Intelligence and Tutoring Systems: Computational and Cognitive Approaches to Communication of Knowledge*, © 1987 Morgan Kaufmann Publishers, Inc., 260 pgs.
K12 Inc.'s First Supplemental Invalidity Contentions, C.A. No. 11-1026 (RGA), Apr. 5, 2013, pp. 1-24.
Exhibit B-1, K12 Inc.'s First Supplemental Invalidity Contentions, C.A. No. 11-1026 (RGA), Apr. 5, 2013, pp. 1-88.
Exhibit B-2, K12 Inc.'s First Supplemental Invalidity Contentions, C.A. No. 11-1026 (RGA), Apr. 5, 2013, pp. 1-54.
Exhibit B-3, K12 Inc.'s First Supplemental Invalidity Contentions, C.A. No. 11-1026 (RGA), Apr. 5, 2013, pp. 1-81.
Exhibit B-4, K12 Inc.'s First Supplemental Invalidity Contentions, C.A. No. 11-1026 (RGA), Apr. 5, 2013, pp. 1-179.
Exhibit B-5, K12 Inc.'s First Supplemental Invalidity Contentions, C.A. No. 11-1026 (RGA), Apr. 5, 2013, pp. 1-103.
Exhibit B-6, K12 Inc.'s First Supplemental Invalidity Contentions, C.A. No. 11-1026 (RGA), Apr. 5, 2013, pp. 1-135.
Exhibit B-7, K12 Inc.'s First Supplemental Invalidity Contentions, C.A. No. 11-1026 (RGA), Apr. 5, 2013, pp. 1-86.
Exhibit B-8, K12 Inc.'s First Supplemental Invalidity Contentions, C.A. No. 11-1026 (RGA), Apr. 5, 2013, pp. 1-76.
Exhibit B-9, K12 Inc.'s First Supplemental Invalidity Contentions, C.A. No. 11-1026 (RGA), Apr. 5, 2013, pp. 1-27.
Exhibit B-10, K12 Inc.'s First Supplemental Invalidity Contentions, C.A. No. 11-1026 (RGA), Apr. 5, 2013, pp. 1-32.

(56) References Cited

OTHER PUBLICATIONS

Exhibit B-11, K12 Inc.'s First Supplemental Invalidity Contentions, C.A. No. 11-1026 (RGA), Apr. 5, 2013, pp. 1-52.
Exhibit B-12, K12 Inc.'s First Supplemental Invalidity Contentions, C.A. No. 11-1026 (RGA), Apr. 5, 2013, pp. 1-44.
Exhibit B-13, K12 Inc.'s First Supplemental Invalidity Contentions, C.A. No. 11-1026 (RGA), Apr. 5, 2013, pp. 1-416.
Exhibit B-14, K12 Inc.'s First Supplemental Invalidity Contentions, C.A. No. 11-1026 (RGA), Apr. 5, 2013, pp. 1-122.
Exhibit B-15, K12 Inc.'s First Supplemental Invalidity Contentions, C.A. No. 11-1026 (RGA), Apr. 5, 2013, pp. 1-80.
Exhibit B-16, K12 Inc.'s First Supplemental Invalidity Contentions, C.A. No. 11-1026 (RGA), Apr. 5, 2013, pp. 1-73.
Exhibit B-17, K12 Inc.'s First Supplemental Invalidity Contentions, C.A. No. 11-1026 (RGA), Apr. 5, 2013, pp. 1-39.
Exhibit B-18, K12 Inc.'s First Supplemental Invalidity Contentions, C.A. No. 11-1026 (RGA), Apr. 5, 2013, pp. 1-32.
Exhibit B-19, K12 Inc.'s First Supplemental Invalidity Contentions, C.A. No. 11-1026 (RGA), Apr. 5, 2013, pp. 1-26.
Exhibit B-20, K12 Inc.'s First Supplemental Invalidity Contentions, C.A. No. 11-1026 (RGA), Apr. 5, 2013, pp. 1-130.
Exhibit B-21, K12 Inc.'s First Supplemental Invalidity Contentions, C.A. No. 11-1026 (RGA), Apr. 5, 2013, pp. 1-90.
Exhibit B-22, K12 Inc.'s First Supplemental Invalidity Contentions, C.A. No. 11-1026 (RGA), Apr. 5, 2013, pp. 1-79.
Exhibit B-23, K12 Inc.'s First Supplemental Invalidity Contentions, C.A. No. 11-1026 (RGA), Apr. 5, 2013, pp. 1-54.
Exhibit B-24, K12 Inc.'s First Supplemental Invalidity Contentions, C.A. No. 11-1026 (RGA), Apr. 5, 2013, pp. 1-22.
Exhibit B-25, K12 Inc.'s First Supplemental Invalidity Contentions, C.A. No. 11-1026 (RGA), Apr. 5, 2013, pp. 1-34.
Exhibit B-26, K12 Inc.'s First Supplemental Invalidity Contentions, C.A. No. 11-1026 (RGA), Apr. 5, 2013, pp. 1-25.
Exhibit B-27, K12 Inc.'s First Supplemental Invalidity Contentions, C.A. No. 11-1026 (RGA), Apr. 5, 2013, pp. 1-57.
Exhibit B-28, K12 Inc.'s First Supplemental Invalidity Contentions, C.A. No. 11-1026 (RGA), Apr. 5, 2013, pp. 1-55.
Exhibit B-29, K12 Inc.'s First Supplemental Invalidity Contentions, C.A. No. 11-1026 (RGA), Apr. 5, 2013, pp. 1-167.
Exhibit B-30, K12 Inc.'s First Supplemental Invalidity Contentions, C.A. No. 11-1026 (RGA), Apr. 5, 2013, pp. 1-76.
Exhibit B-31, K12 Inc.'s First Supplemental Invalidity Contentions, C.A. No. 11-1026 (RGA), Apr. 5, 2013, pp. 1-65.
Exhibit B-32, K12 Inc.'s First Supplemental Invalidity Contentions, C.A. No. 11-1026 (RGA), Apr. 5, 2013, pp. 1-57.
Exhibit B-33, K12 Inc.'s First Supplemental Invalidity Contentions, C.A. No. 11-1026 (RGA), Apr. 5, 2013, pp. 1-66.
About KnowledgeSoft, http://web.archive.org/web/19970330114029/http://knowledgesoft.com/about/about.htm, http://web.archive.org/web/19970625102921/http://www.knowledgesoft.com/products/screens.htm, http://web.archive.org/web/19970330114045/http:/www.knowledgesoft.com/products/products.htm, *allegedly dated*Mar. 30, 1997, download date Nov. 12, 2012, 17 pages.
"KnowledgeSoft Enters Agreement with Centra Software to Offer Live Instructor-led Training Over the Web," http://web.archive.org/web/19970625102115/http://www.knowledgesoft.com/press/centra2.htm, *allegedly dated*Feb. 12, 1997, download date Nov. 12, 2012, 2 pages.
"KnowledgeSoft, Inc. Releases LOIS—Learning Organization Information System—The First "Knowledge Management" Software for Corporations," http://web.archive.org/web/19970625102140/http://www.knowledgesoft.com/press/announc.htm, *allegedly dated*Sep. 6, 1996, download date Nov. 12, 2012, 2 pages.
"Web-Based Training Cookbook: Everything you need to know for online training," Chapter Ten: Program Administration, © 1997 Brandon Hall, 26 pages.
Part 1: Pathlore Learning Management System, "Classroom Learning Administration," Release 4.0, *allegedly dated*2000, 148 pages.
Part 2: Pathlore Learning Management System, "Classroom Learning Administration," Release 4.0, *allegedly dated*2000, 151 pages.
Part 3: Pathlore Learning Management System, "Classroom Learning Administration," Release 4.0, *allegedly dated*2000, 173 pages.
Registrar® for Windows® User's Guide, Release 5.3, Ch. 1, 5, 6, 7 and 12, Silton-Bookman Systems, *allegedly dated*Jun. 1996, 32 pages.
Silton-Bookman Systems Product Overview, "Training administration software that lets you see and do things your way. Automatically." http://web.archive.org/web/19970108014035/http://www.sbsinc.com/overview.html, *allegedly dated*Jan. 8, 1997, download date Jan. 2, 2013, 5 pages.
"Your Personal Trainer for the ACT 1.0," © 1995 Davidson & Associates, Inc., 21 pages.
"Davidson & Associates Announces New Test Preparation Software for ACT and GRE College Entrance Exams at E3," PR Newswire, May 11, 1995, 6 pages.
"Anxious About College Admissions and the SAT? Students Find Solace in 10 New Products from Kaplan Educational Centers," PR Newswire, Aug. 14, 1995, 2 pages.
"Kaplan SAT RoadTrip 96 & College Search User's Guide," *allegedly dated*1995, 22 pages.
Frasson, Claude, "Some Characteristics of Instructional Design for Industrial Training," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 1-8.
Giroux, S., et al., "Epiphyte Advisor Systems for Collaborative Learning," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 42-50.
Huang, Sherman X., "On Content-Balanced Adaptive Testing," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 60-68.
Looi, C. et al. "Wordmath: A Computer-Based Environment for Learning Word Problem Solving," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover page and pp. 78-86.
Mangelle, T. et al. "A Multi-Agent Architecture for an ITS with Multiple Strategies," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 96-104.
Patel, A. et al. "Applied Artificial Intelligence for Teaching Numeric Topics in Engineering Disciplines," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover page and pp. 132-140.
Pescador, F. et al. "Authoring System for Reinforcement and Evaluation (SARE)," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover page and pp. 195-203.
Parodi G. et al. "Cooperative and Distance Learning in Electronics Using Internet," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover page and pp. 213-219.

(56) References Cited

OTHER PUBLICATIONS

Warkentyne, H.M.K. et al. "Implementation and Evaluation of a WWW Multiple Choice Question Server," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez, I. Fernandez de Castro (Eds.), Cover page and pp. 228-235.
Baniulis, K. et al. "Flexible Intelligent Environment for Tutoring and Assessing Learners," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover page and pp. 424-426.
Bender-Oberg, A. et al. "DLW—A Learning Environment for Lake Water Diagnosis," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover page and pp. 427-429.
Oracle Corporation's Invalidity Contentions, C.A. No. 11-825 (RGA), filed Mar. 1, 2013, pp. 1-106.
Exhibit E.1, Oracle Corporation's Invalidity Contentions, C.A. No. 11-825 (RGA), filed Mar. 1, 2013, pp. 1-54.
Exhibit E.2, Oracle Corporation's Invalidity Contentions, C.A. No. 11-825 (RGA), filed Mar. 1, 2013, pp. 1-48.
Exhibit F.1, Oracle Corporation's Invalidity Contentions, C.A. No. 11-825 (RGA), filed Mar. 1, 2013, pp. 1-66.
Exhibit F.2, Oracle Corporation's Invalidity Contentions, C.A. No. 11-825 (RGA), filed Mar. 1, 2013, pp. 1-57.
Exhibit G.1, Oracle Corporation's Invalidity Contentions, C.A. No. 11-825 (RGA), filed Mar. 1, 2013, pp. 1-52.
Exhibit G.2, Oracle Corporation's Invalidity Contentions, C.A. No. 11-825 (RGA), filed March 1, 2013, pp. 1-77.
Exhibit G.3, Oracle Corporation's Invalidity Contentions, C.A. No. 11-825 (RGA), filed Mar. 1, 2013, pp. 1-56.
Expert Report on Invalidity by Kris Jamsa, C.A. No. 11-876-RGA, dated Jul. 29, 2013, pp. 1-421.
Scardamalia, M., et al. "Computer-Supported Intentional Learning Environments," J. Educational Computing Research, vol. 5(1), 51-68, 1989, 16 pgs.
Ishii, Hiroshi. "TeamWorkStation: Towards a Seamless Shared Workspace," CSCW 90 Proceedings, Oct. 1990, pp. 13-26.
Steed, Colin. *Web-based Training*, © Colin Steed 1999, Gower Publishing Limited, Book Cover, Publication pages, Table of Contents and pp. 98-106.
Lotus LearningSpace Installation and Administration Guide, Release 2.5, © 1996, 1997, 1998 Lotus Development Corporation, Cover Page, Publication Page, Table of Contents and pp. 1-31, 33-43.
Merrill, M. David. Excerpts from *The Instructional Design Library: TICCIT*, vol. 40, © 1980 Educational Technology Publications, Inc., Cover page, Publication page, pp. 3-11, 22-69 and 126-129.
Brusilovsky, Peter. "Student model centered architecture for intelligent learning environments," In Proc. of Fourth International Conference on User Modeling, Aug. 15-19, 1994, 10 pgs.
Shute, Valerie J. "SMART: Student Modeling Approach for Responsive Tutoring," User Modeling and User-Adapted Interaction, vol. 5, 1995, pp. 1-44 and back cover.
Schneck, Marjorie A. "Plato Implementations and Evaluations: New Behaviors and Objectives for Education," EdCompCon '84 Proceedings, University of Maryland, Nov. 8-10, 1984, Document Information page and pp. 91-104.
Suppes, Patrick. "Chapter 17. Computer-based Mathematics Instruction," *The Computer In the School: Tutor, Tool, Tutee* Taylor, R., ed, © 1980 Teachers College, Columbia University, Cover page, Publication page and pp. 215-230.
Alessi, Stephen M. et al. "Chapter 3. Drills," *Computer-Based Instruction: Method and Deveolment*, $2^{nd}$ edition, © 1991, 1985 Prentice-Hall, Inc., Cover page, Publication page and pp. 91-99, 102-117.
K12 Inc.'s Second Supplemental Invalidity Contentions, C.A. No. 11-1026 (RGA), dated Sep. 4, 2013, pp. 1-25.
Exhibit B-34, K12 Inc.'s Second Supplemental Invalidity Contentions, C.A. No. 11-1026 (RGA), dated Sep. 4, 2013, pp. 1-93.
K12 Inc.'s Third Supplemental Invalidity Contentions, C.A. No. 11-1026 (RGA), dated Oct. 16, 2013, pp. 1-25.
Exhibit B-35, K12 Inc.'s Third Supplemental Invalidity Contentions, C.A. No. 11-1026 (RGA), dated Oct. 16, 2013, pp. 1-60.
Declaration of Fred Hofstetter, Blackboard Inc. vs. Desire2Learn Inc., Case No. 9:06 CV 155, dated Oct. 17, 2007, 3 pgs.
"History of Serf® Feature Development," www.serfsoft.com, 2 pgs.
Hofstetter, Fred T. "Three Waves of the Serf Web-based Teaching and Learning Environment," *Riding the Serf*, May 19, 1999, pp. 1-24.
Hofstetter, Fred T. "Serf® Administrator Guide," Version 1.0, Last Modified Nov. 12, 1997, © 1997 University of Delaware, pp. 1-30.
Hofstetter, Fred T. "Serf® Administrator Guide," Version 2.0, Last Modified Aug. 31, 1998, © 1998 University of Delaware, pp. 1-30.
Hofstetter, Fred T. "Serf® Administrator Guide," Version 3.0, Last Modified Feb. 28, 2000, © 1997-2000 Serfsoft Corporation, pp. 1-31.
Hofstetter, Fred T. "Serf® Instructor Guide," Version 1.0, Last Modified Nov. 12, 1997, © 1997 University of Delaware, pp. 1-30.
Hofstetter, Fred T. "Serf® Instructor Guide," Version 2.0, Last Modified Aug. 31, 1998, © 1998 University of Delaware, pp. 1-71.
Hofstetter, Fred T. "Serf® Instructor Guide," Version 3.0, Last Modified Feb. 28, 2000, © 1997-2000 Serfsoft Corporation, pp. 1-88.
Hofstetter, Fred T. "Serf® Student Jumpstart," Version 2.0, Last Modified Aug. 31, 1998, © 1998 University of Delaware, pp. 1-10.
Hofstetter, Fred T. "Serf's Up! Teaching and Learning with Serf, Your Servant on the Internet," Sep. 21, 1997, pp. 1-12.
Hofstetter, Fred T. "Serf® Sysadmin Guide," Version 1.0, Last Modified Nov. 12, 1997, © 1997 University of Delaware, pp. 1-17.
Hofstetter, Fred T. "Serf® Sysadmin Guide," Version 2.0, Last Modified Aug. 31, 1998, © 1998 University of Delaware, pp. 1-20.
Hofstetter, Fred T. "Serf® Sysadmin Guide," Version 3.0, Last Modified Feb. 28, 2000, © 1997-2000 Serfsoft Corporation, pp. 1-22.
Hofstetter, Fred T. "Serf® Teaching Assistant Guide," Version 1.0, Last Modified Nov. 12, 1997, © 1997 University of Delaware, pp. 1-12.
Hofstetter, Fred T. "Serf® Teaching Assistant Guide," Version 2.0, Last Modified Aug. 31, 1998, © 1998 University of Delaware, pp. 1-19.
Hofstetter, Fred T. "Serf® User Guide," Version 1.0, Last Modified Nov. 12, 1997, © 1997 University of Delaware, pp. 1-3.
Hofstetter, Fred T. "Serf® User Guide," Version 2.0, Last Modified Aug. 31, 1998, © 1998 University of Delaware, pp. 1-3.
Hofstetter, Fred T. "Serf® User Guide," Version 3.0, Last Modified Feb. 28, 2000, © 1997-2000 Serfsoft Corporation, pp. 1-3.
Oracle Corporation's Supplemental Invalidity Contentions, C.A. No. 11-825 (RGA), filed Oct. 4, 2013, pp. 1-34.
Harvett, Kathy, "The History of WebTycho", Achiever, The Alumni Magazine of University of Maryland University College, Spring 2003, Cover page and pp. 14-17.
*IpLearn LLC v. Blackboard Inc.*, Claim Construction Order, C.A. No. 11-876-RGA, filed Feb. 19, 2014, pp. 1-4.
*IpLearn LLC v. K12 Inc.*, Claim Construction Order, C.A. No. 11-1026-RGA, filed Feb. 18, 2014, pp. 1-2.
*IpLearn, LLC v. Oracle Corporation et al.*, Claim Construction Order, C.A. No. 11-825- RGA, filed Feb. 21, 2014, pp. 1-3.
Oracle Corporation's Second Supplemental Invalidity Contentions, C.A. No. 11-825-RGA, filed Feb. 7, 2014, pp. 1-19.
Exhibit E.3, Oracle Corporation's Supplemental Invalidity Contentions, C.A. No. 11-825 (RGA), filed Oct. 4, 2013, pp. 1-33.
Exhibit E.4, Oracle Corporation's Supplemental Invalidity Contentions, C.A. No. 11-825 (RGA), filed Oct. 4, 2013, pp. 1-48.
Exhibit E.5, Oracle Corporation's Supplemental Invalidity Contentions, C.A. No. 11-825 (RGA), filed Oct. 4, 2013, pp. 1-29.
Exhibit F.3, Oracle Corporation's Supplemental Invalidity Contentions, C.A. No. 11-825 (RGA), filed Oct. 4, 2013, pp. 1-29.
Exhibit F.4, Oracle Corporation's Supplemental Invalidity Contentions, C.A. No. 11-825 (RGA), filed Oct. 4, 2013, pp. 1-35.
Exhibit F.5, Oracle Corporation's Supplemental Invalidity Contentions, C.A. No. 11-825 (RGA), filed Oct. 4, 2013, pp. 1-27.

(56) References Cited

OTHER PUBLICATIONS

Exhibit G.4, Oracle Corporation's Supplemental Invalidity Contentions, C.A. No. 11-825 (RGA), filed Oct. 4, 2013, pp. 1-40.
Exhibit G.5, Oracle Corporation's Supplemental Invalidity Contentions, C.A. No. 11-825 (RGA), filed Oct. 4, 2013, pp. 1-41.
Exhibit G.6, Oracle Corporation's Supplemental Invalidity Contentions, C.A. No. 11-825 (RGA), filed Oct. 4, 2013, pp. 1-34.
Blackboard Inc.'s Initial Invalidity Contentions, C.A. No. 1:11-CV-876-RGA, filed May 29, 2012, pp. 1-37.
Blackboard Inc.'s Supplemental Initial Invalidity Contentions, C.A. No. 1:11-CV-876-RGA, filed May 6, 2013, pp. 1-49.
Exhibit F-1, Blackboard Inc.'s Initial Invalidity Contentions, C.A. No. 1:11-CV-876-RGA, filed May 29, 2012, pp. 1-9.
Exhibit F-2, Blackboard Inc.'s Initial Invalidity Contentions, C.A. No. 1:11-CV-876-RGA, filed May 29, 2012, pp. 1-16.
Exhibit F-3, Blackboard Inc.'s Supplemental Initial Invalidity Contentions, C.A. No. 1:11- CV-876-RGA, filed May 6, 2013, pp. 1-9.
Exhibit F-4, Blackboard Inc.'s Supplemental Initial Invalidity Contentions, C.A. No. 1:11-CV-876-RGA, filed May 6, 2013, pp. 1-29.
Exhibit F-5, Blackboard Inc.'s Supplemental Initial Invalidity Contentions, C.A. No. 1:11-CV-876-RGA, filed May 6, 2013, pp. 1-19.
Exhibit G-1, Blackboard Inc.'s Initial Invalidity Contentions, C.A. No. 1:11-CV-876-RGA, filed May 29, 2012, pp. 1-13.
Exhibit G-2, Blackboard Inc.'s Initial Invalidity Contentions, C.A. No. 1:11-CV-876-RGA, filed May 29, 2012, pp. 1-11.
Exhibit G-3, Blackboard Inc.'s Supplemental Initial Invalidity Contentions, C.A. No. 1:11-CV-876-RGA, filed May 6, 2013, pp. 1-20.
Exhibit G-4, Blackboard Inc.'s Supplemental Initial Invalidity Contentions, C.A. No. 1:11-CV-876-RGA, filed May 6, 2013, pp. 1-13.
Exhibit G-5, Blackboard Inc.'s Supplemental Initial Invalidity Contentions, C.A. No. 1:11-CV-876-RGA, filed May 6, 2013, pp. 1-7.
Exhibit 1-1, Blackboard Inc.'s Initial Invalidity Contentions, C.A. No. 1:11-CV-876-RGA, filed May 29, 2012, pp. 1-16.
Exhibit 1-2, Blackboard Inc.'s Supplemental Initial Invalidity Contentions, C.A. No. 1:11-CV-876-RGA, filed May 6, 2013, pp. 1-14.
Exhibit 1-3, Blackboard Inc.'s Supplemental Initial Invalidity Contentions, C.A. No. 1:11- CV-876-RGA, filed May 6, 2013, pp. 1-16.
Exhibit 1-4, Blackboard Inc.'s Supplemental Initial Invalidity Contentions, C.A. No. 1:11-CV-876-RGA, filed May 6, 2013, pp. 1-75.
Exhibit 1-5, Blackboard Inc.'s Supplemental Initial Invalidity Contentions, C.A. No. 1:11-CV-876-RGA, filed May 6, 2013, pp. 1-9.
Exhibit 1-6, Blackboard Inc.'s Supplemental Initial Invalidity Contentions, C.A. No. 1:11-CV-876-RGA, filed May 6, 2013, pp. 1-27.
Exhibit 1-7, Blackboard Inc.'s Supplemental Initial Invalidity Contentions, C.A. No. 1:11-CV-876-RGA, filed May 6, 2013, pp. 1-40.
Exhibit 1-8, Blackboard Inc.'s Supplemental Initial Invalidity Contentions, C.A. No. 1:11-CV-876-RGA, filed May 6, 2013, pp. 1-42.
Exhibit 1-9, Blackboard Inc.'s Supplemental Initial Invalidity Contentions, C.A. No. 1:11-CV-876-RGA, filed May 6, 2013, pp. 1-59.
Exhibit 1-10, Blackboard Inc.'s Supplemental Initial Invalidity Contentions, C.A. No. 1:11-CV-876-RGA, filed May 6, 2013, pp. 1-13.
Exhibit 1-11, Blackboard Inc.'s Supplemental Initial Invalidity Contentions, C.A. No. 1:11-C-876-RGA, filed May 6, 2013, pp. 1-14.
Exhibit 1-12, Blackboard Inc.'s Supplemental Initial Invalidity Contentions, C.A. No. 1:11-CV-876-RGA, filed May 6, 2013, pp. 1-36.
Exhibit 1-13, Blackboard Inc.'s Supplemental Initial Invalidity Contentions, C.A. No. 1:11-CV-876-RGA, filed May 6, 2013, pp. 1-19.
Exhibit 1-14, Blackboard Inc.'s Supplemental Initial Invalidity Contentions, C.A. No. 1:11-CV-876-RGA, filed May 6, 2013, pp. 1-34.
Exhibit 1-15, Blackboard Inc.'s Supplemental Initial Invalidity Contentions, C.A. No. 1:11-CV-876-RGA, filed May 6, 2013, pp. 1-52.
Exhibit 1-16, Blackboard Inc.'s Supplemental Initial Invalidity Contentions, C.A. No. 1:11-CV-876-RGA, filed May 6, 2013, pp. 1-188.
Exhibit 1-17, Blackboard Inc.'s Supplemental Initial Invalidity Contentions, C.A. No. 1:11-CV-876-RGA, filed May 6, 2013, pp. 1-19.
Exhibit 1-18, Blackboard Inc.'s Supplemental Initial Invalidity Contentions, C.A. No. 1:11-CV-876-RGA, filed May 6, 2013, pp. 1-22.
Exhibit 1-19, Blackboard Inc.'s Supplemental Initial Invalidity Contentions, C.A. No. 1:11-CV-876-RGA, filed May 6, 2013, pp. 1-15.
Exhibit 1-20, Blackboard Inc.'s Supplemental Initial Invalidity Contentions, C.A. No. 1:11-CV-876-RGA, filed May 6, 2013, pp. 1-13.
Exhibit 1-21, Blackboard Inc.'s Supplemental Initial Invalidity Contentions, C.A. No. 1:11-CV-876-RGA, filed May 6, 2013, pp. 1-41.
Exhibit 1-22, Blackboard Inc.'s Supplemental Initial Invalidity Contentions, C.A. No. 1:11-CV-876-RGA, filed May 6, 2013, pp. 1-62.
Exhibit 1-23, Blackboard Inc.'s Supplemental Initial Invalidity Contentions, C.A. No. 1:11-CV-876-RGA, filed May 6, 2013, pp. 1-46.
Exhibit 1-24, Blackboard Inc.'s Supplemental Initial Invalidity Contentions, C.A. No. 1:11-CV-876-RGA, filed May 6, 2013, pp. 1-81.
Exhibit 1-25, Blackboard Inc.'s Supplemental Initial Invalidity Contentions, C.A. No. 1:11-CV-876-RGA, filed May 6, 2013, pp. 1-40.
Exhibit 1-26, Blackboard Inc.'s Supplemental Initial Invalidity Contentions, C.A. No. 1:11-CV-876-RGA, filed May 6, 2013, pp. 1-25.
Exhibit 1-27, Blackboard Inc.'s Supplemental Initial Invalidity Contentions, C.A. No. 1:11-CV-876-RGA, filed May 6, 2013, pp. 1-25.
Exhibit 1-28, Blackboard Inc.'s Supplemental Initial Invalidity Contentions, C.A. No. 1:11-CV-876-RGA, filed May 6, 2013, pp. 1-43.
Exhibit 1-29, Blackboard Inc.'s Supplemental Initial Invalidity Contentions, C.A. No. 1:11-CV-876-RGA, filed May 6, 2013, pp. 1-25.
Exhibit 1-30, Blackboard Inc.'s Supplemental Initial Invalidity Contentions, C.A. No. 1:11-CV-876-RGA, filed May 6, 2013, pp. 1-36.
Exhibit 1-31, Blackboard Inc.'s Supplemental Initial Invalidity Contentions, C.A. No. 1:11-CV-876-RGA, filed May 6, 2013, pp. 1-30.
Exhibit 1-32, Blackboard Inc.'s Supplemental Initial Invalidity Contentions, C.A. No. 1:11-CV-876-RGA, filed May 6, 2013, pp. 1-34.
Exhibit 1-33, Blackboard Inc.'s Supplemental Initial Invalidity Contentions, C.A. No. 1:11-CV-876-RGA, filed May 6, 2013, pp. 1-33.
Exhibit 1-34, Blackboard Inc.'s Supplemental Initial Invalidity Contentions, C.A. No. 1:11-CV-876-RGA, filed May 6, 2013, pp. 1-30.
K12s Inc.'s Initial Invalidity Contentions, C.A. No. 11-1026 (RGA), Jan. 29, 2013, pp. 1-22.
Exhibit B-1, K12 Inc.'s Initial Invalidity Contentions, C.A. No. 11-1026 (RGA), dated Jan. 29, 2013, pp. 1-84.
Exhibit B-2, K12 Inc.'s Initial Invalidity Contentions, C.A. No. 11-1026 (RGA), dated Jan. 29, 2013, pp. 1-53.
Exhibit B-3, K12 Inc.'s Initial Invalidity Contentions, C.A. No. 11-1026 (RGA), dated Jan. 29, 2013, pp. 1-79.
Exhibit B-4, K12 Inc.'s Initial Invalidity Contentions, C.A. No. 11-1026 (RGA), dated Jan. 29, 2013, pp. 1-190.
Exhibit B-5, K12 Inc.'s Initial Invalidity Contentions, C.A. No. 11-1026 (RGA), dated Jan. 29, 2013, pp. 1-101.
Exhibit B-6, K12 Inc.'s Initial Invalidity Contentions, C.A. No. 11-1026 (RGA), dated Jan. 29, 2013, pp. 1-109.
Exhibit B-7, K12 Inc.'s Initial Invalidity Contentions, C.A. No. 11-1026 (RGA), dated Jan. 29, 2013, pp. 1-84.
Exhibit B-8, K12 Inc.'s Initial Invalidity Contentions, C.A. No. 11-1026 (RGA), dated Jan. 29, 2013, pp. 1-74.
Exhibit B-9, K12 Inc.'s Initial Invalidity Contentions, C.A. No. 11-1026 (RGA), dated Jan. 29, 2013, pp. 1-27.
Exhibit B-10, K12 Inc.'s Initial Invalidity Contentions, C.A. No. 11-1026 (RGA), dated Jan. 29, 2013, pp. 1-32.
Exhibit B-11, K12 Inc.'s Initial Invalidity Contentions, C.A. No. 11-1026 (RGA), dated Jan. 29, 2013, pp. 1-52.
Exhibit B-12, K12 Inc.'s Initial Invalidity Contentions, C.A. No. 11-1026 (RGA), dated Jan. 29, 2013, pp. 1-44.
Exhibit B-13, K12 Inc.'s Initial Invalidity Contentions, C.A. No. 11-1026 (RGA), dated Jan. 29, 2013, pp. 1-401.
Exhibit B-14, K12 Inc.'s Initial Invalidity Contentions, C.A. No. 11-1026 (RGA), dated Jan. 29, 2013, pp. 1-117.
Exhibit B-15, K12 Inc.'s Initial Invalidity Contentions, C.A. No. 11-1026 (RGA), dated Jan. 29, 2013, pp. 1-77.
Exhibit B-16, K12 Inc.'s Initial Invalidity Contentions, C.A. No. 11-1026 (RGA), dated Jan. 29, 2013, pp. 1-69.
Exhibit B-17, K12 Inc.'s Initial Invalidity Contentions, C.A. No. 11-1026 (RGA), dated Jan. 29, 2013, pp. 1-39.
Exhibit B-18, K12 Inc.'s Initial Invalidity Contentions, C.A. No. 11-1026 (RGA), dated Jan. 29, 2013, pp. 1-28.
Exhibit B-19, K12 Inc.'s Initial Invalidity Contentions, C.A. No. 11-1026 (RGA), dated Jan. 29, 2013, pp. 1-26.
Exhibit B-20, K12 Inc.'s Initial Invalidity Contentions, C.A. No. 11-1026 (RGA), dated Jan. 29, 2013, pp. 1-123.

(56) References Cited

OTHER PUBLICATIONS

Exhibit B-21, K12 Inc.'s Initial Invalidity Contentions, C.A. No. 11-1026 (RGA), dated Jan. 29, 2013, pp. 1-87.
Exhibit B-22, K12 Inc.'s Initial Invalidity Contentions, C.A. No. 11-1026 (RGA), dated Jan. 29, 2013, pp. 1-75.
Exhibit B-23, K12 Inc.'s Initial Invalidity Contentions, C.A. No. 11-1026 (RGA), dated Jan. 29, 2013, pp. 1-52.
Exhibit B-24, K12 Inc.'s Initial Invalidity Contentions, C.A. No. 11-1026 (RGA), dated Jan. 29, 2013, pp. 1-21.
Exhibit B-25, K12 Inc.'s Initial Invalidity Contentions, C.A. No. 11-1026 (RGA), dated Jan. 29, 2013, pp. 1-33.
Exhibit B-26, K12 Inc.'s Initial Invalidity Contentions, C.A. No. 11-1026 (RGA), dated Jan. 29, 2013, pp. 1-26.
Exhibit B-27, K12 Inc.'s Initial Invalidity Contentions, C.A. No. 11-1026 (RGA), dated Jan. 29, 2013, pp. 1-53.
Exhibit B-28, K12 Inc.'s Initial Invalidity Contentions, C.A. No. 11-1026 (RGA), dated Jan. 29, 2013, pp. 1-55.
Exhibit B-29, K12 Inc.'s Initial Invalidity Contentions, C.A. No. 11-1026 (RGA), dated Jan. 29, 2013, pp. 1-158.
Exhibit B-30, K12 Inc.'s Initial Invalidity Contentions, C.A. No. 11-1026 (RGA), dated Jan. 29, 2013, pp. 1-75.
Exhibit B-31, K12 Inc.'s Initial Invalidity Contentions, C.A. No. 11-1026 (RGA), dated Jan. 29, 2013, pp. 1-63.
K12 Inc.'s Fourth Supplemental Invalidity Contentions, C.A. No. 11-1026 (RGA), dated Jan. 17, 2014, pp. 1-4.
Exhibit B-36, K12 Inc.'s Fourth Supplemental Invalidity Contentions, C.A. 11-1026 (RGA), dated Jan. 17, 2014, pp. 1-94.
Exhibit B-37, K12 Inc.'s Fourth Supplemental Invalidity Contentions, C.A. 11-1026 (RGA), dated Jan. 17, 2014, pp. 1-42.
Exhibit B-38, K12 Inc.'s Fourth Supplemental Invalidity Contentions, C.A. Nov. 1026 (RGA), dated Jan. 17, 2014, pp. 1-139.
IpLearn's Response to K12's Motion for Summary Judgment, C.A. No. 1:11-cv-01026-RGA, filed Aug. 4, 2014, pp. 1-46.
Exhibit 2, IpLearn's Response to K12's Motion for Summary Judgment, C.A. No. 1:11-cv-01026, filed Aug. 4, 2014, pp. 1-3.
Corrected Exhibit 3 to IpLearn's Response to K12's Motion for Summary Judgment, C.A. No. 1:11-cv-01026-RGA, Oct. 23, 2014, pp. 1-8.
Exhibit 4, IpLearn's Response to K12's Motion for Summary Judgment, C.A. No. 1:11-cv-01026, filed Aug. 4, 2014, pp. 1-40.
Exhibit 10, IpLearn's Response to K12's Motion for Summary Judgment, C.A. No. 1:11-cv-01026, filed Aug. 4, 2014, pp. 1-6.
Exhibit 11, IpLearn's Response to K12's Motion for Summary Judgment, C.A. No. 1:11-cv-01026, filed Aug. 4, 2014, pp. 1-8.
Exhibit 12, IpLearn's Response to K12's Motion for Summary Judgment, C.A. No. 1:11-cv-01026, filed Aug. 4, 2014, pp. 1-4.
Exhibit 14, IpLearn's Response to K12's Motion for Summary Judgment, C.A. No. 1:11-cv-01026, filed Aug. 4, 2014, pp. 1-7.
Exhibit 15, IpLearn's Response to K12's Motion for Summary Judgment, C.A. No. 1:11-cv-01026, filed Aug. 4, 2014, pp. 1-15.
Exhibit 16, IpLearn's Response to K12's Motion for Summary Judgment, C.A. No. 1:11-cv-01026, filed Aug. 4, 2014, pp. 1-8.
Exhibit 23, IpLearn's Response to K12's Motion for Summary Judgment, C.A. No. 1:11-cv-01026, filed Aug. 4, 2014, pp. 1-4.
Declaration of David N. Draper in Support of Defendant K12 Inc.'s Motion for Summary Judgment, C.A. No. 1:11-cv-01026-RGA, filed Jul. 2, 2014, pp. 1-7.
Declaration of David N. Draper in Support of Defendant K12 Inc.'s Motion for Summary Judgment (vol. 2 - Exhibits 26-51), C.A. No. 1:11-cv-01026-RGA, filed Jul. 2, 2014, pp. 1-7.
Exhibit 1, Declaration of David N. Draper in Support of Defendant K12 Inc.'s Motion for Summary Judgment, C.A. No. 1:11-cv-01026-RGA, filed Jul. 2, 2014, pp. 1-22.
Exhibit 3, Declaration of David N. Draper in Support of Defendant K12 Inc.'s Motion for Summary Judgment, C.A. No. 1:11-cv-01026-RGA, filed Jul. 2, 2014, pp. 1-4.
Exhibit 4, Declaration of David N. Draper in Support of Defendant K12 Inc.'s Motion for Summary Judgment, C.A. No. 1:11-cv-01026-RGA, filed Jul. 2, 2014, pp. 1-31.
Exhibit 5, Declaration of David N. Draper in Support of Defendant K12 Inc.'s Motion for Summary Judgment, C.A. No. 1:11-cv-01026-RGA, filed Jul. 2, 2014, pp. 1-11.
Exhibit 6, Declaration of David N. Draper in Support of Defendant K12 Inc.'s Motion for Summary Judgment, C.A. No. 1:11-cv-01026-RGA, filed Jul. 2, 2014, pp. 1-15.
Exhibit 7, Declaration of David N. Draper in Support of Defendant K12 Inc.'s Motion for Summary Judgment, C.A. No. 1:11-cv-01026-RGA, filed Jul. 2, 2014, pp. 1-10.
Exhibit 8, Declaration of David N. Draper in Support of Defendant K12 Inc.'s Motion for Summary Judgment, C.A. No. 1:11-cv-01026-RGA, filed Jul. 2, 2014, pp. 1-23.
Exhibit 9, Declaration of David N. Draper in Support of Defendant K12 Inc.'s Motion for Summary Judgment, C.A. No. 1:11-cv-01026-RGA, filed Jul. 2, 2014, pp. 1-9.
Exhibit 10, Declaration of David N. Draper in Support of Defendant K12 Inc.'s Motion for Summary Judgment, C.A. No. 1:11-cv-01026-RGA, filed Jul. 2, 2014, pp. 1-2.
Exhibit 26, Declaration of David N. Draper in Support of Defendant K12 Inc.'s Motion for Summary Judgment, C.A. No. 1:11-cv-01026-RGA, filed Jul. 2, 2014, pp. 1-2.
Exhibit 28, Declaration of David N. Draper in Support of Defendant K12 Inc.'s Motion for Summary Judgment, C.A. No. 1:11-cv-01026-RGA, filed Jul. 2, 2014, pp. 1-10.
Exhibit 30, Declaration of David N. Draper in Support of Defendant K12 Inc.'s Motion for Summary Judgment, C.A. No. 1:11-cv-01026-RGA, filed Jul. 2, 2014, pp. 1-14.
Exhibit 31, Declaration of David N. Draper in Support of Defendant K12 Inc.'s Motion for Summary Judgment, C.A. No. 1:11-cv-01026-RGA, filed Jul. 2, 2014, pp. 1-26.
Exhibit 32, Declaration of David N. Draper in Support of Defendant K12 Inc.'s Motion for Summary Judgment, C.A. No. 1:11-cv-01026-RGA, filed Jul. 2, 2014, pp. 1-10.
Exhibit 33, Declaration of David N. Draper in Support of Defendant K12 Inc.'s Motion for Summary Judgment, C.A. No. 1:11-cv-01026-RGA, filed Jul. 2, 2014, pp. 1-37.
Exhibit 34, Declaration of David N. Draper in Support of Defendant K12 Inc.'s Motion for Summary Judgment, C.A. No. 1:11-cv-01026-RGA, filed Jul. 2, 2014, pp. 1-5.
Exhibit 36, Declaration of David N. Draper in Support of Defendant K12 Inc.'s Motion for Summary Judgment, C.A. No. 1:11-cv-01026-RGA, filed Jul. 2, 2014, pp. 1-5.
Exhibit 37, Declaration of David N. Draper in Support of Defendant K12 Inc.'s Motion for Summary Judgment, C.A. No. 1:11-cv-01026-RGA, filed Jul. 2, 2014, pp. 1-37.
Exhibit 38, Declaration of David N. Draper in Support of Defendant K12 Inc.'s Motion for Summary Judgment, C.A. No. 1:11-cv-01026-RGA, filed Jul. 2, 2014, pp. 1-10.
Exhibit 39, Declaration of David N. Draper in Support of Defendant K12 Inc.'s Motion for Summary Judgment, C.A. No. 1:11-cv-01026-RGA, filed Jul. 2, 2014, pp. 1-2.
Exhibit 40, Declaration of David N. Draper in Support of Defendant K12 Inc.'s Motion for Summary Judgment, C.A. No. 1:11-cv-01026-RGA, filed Jul. 2, 2014, pp. 1-16.
K12's Reply Brief in Support of Its Motion for Summary Judgment, C.A. No. 1:11-cv-01026-RGA, filed Aug. 14, 2014, pp. 1-28.
Declaration of David N. Draper in Support of K12 Inc.'s Reply Brief in Support of Its Motion for Summary Judgment, C.A. No. 1:11-cv-01026-RGA, filed Aug. 14, 2014, pp. 1-3.
Exhibit 52, Declaration of David N. Draper in Support of Defendant K12 Inc.'s Motion for Summary Judgment, C.A. No. 1:11-cv-01026-RGA, filed Aug. 14, 2014, pp. 1-13.
Exhibit 59, Declaration of David N. Draper in Support of Defendant K12 Inc.'s Motion for Summary Judgment, C.A. No. 1:11-cv-01026-RGA, filed Aug. 14, 2014, pp. 1-27.
Exhibit 60, Declaration of David N. Draper in Support of Defendant K12 Inc.'s Motion for Summary Judgment, C.A. No. 1:11-cv-01026-RGA, filed Aug. 14, 2014, pp. 1-6.
Defendant K12 Inc.'s Motion for Summary Judgment, C.A. No. 1:11-cv-01026-RGA, filed Jun. 25, 2014, pp. 1-2.
K12 Inc.'s Opening Brief in Support of Motion for Summary Judgment, C.A. No. 1:11-cv-001026-RGA, filed Jul. 2, 2014, pp. 1-45.

(56) References Cited

OTHER PUBLICATIONS

Defendant Blackboard Inc.'s [Proposed] Order, C.A. No. 1:11-CV-00876-RGA, filed Jul. 1, 2014, pp. 1.
Blackboard Inc.'s Motion for Summary Judgment, C.A. No. 1:11-CV-00876-RGA, filed Jul. 1, 2014, pp. 1-2.
Blackboard Inc.'s Opening Brief in Support of Its Motion for Summary Judgment, C.A. No. 1:11-CV-00876-RGA, filed Jul. 10, 2014, pp. 1-48.
Declaration of Allan A. Kassenoff, *IpLearn, LLC, v. Blackboard, Inc.*, C.A. No. 1:11-CV-00786-RGA, filed Jul. 1, 2014, pp. 1-3.
Exhibit A, Declaration of Allan A. Kassenoff, *IpLearn, LLC, v. Blackboard, Inc.*, C.A. No. 1:11-CV-00876-RGA, filed Jul. 1, 2014, pp. 1-3.
Exhibit B, Declaration of Allan A. Kassenoff, *IpLearn, LLC, v. Blackboard, Inc.*, C.A. No. 1:11-CV-00876-RGA, filed Jul. 1, 2014, pp. 1-2.
Exhibit D, Declaration of Allan A. Kassenoff, *IpLearn, LLC, v. Blackboard, Inc.*, C.A. No. 1:11-CV-00876-RGA, filed Jul. 1, 2014, pp. 1-4.
Exhibit E, Declaration of Allan A. Kassenoff, *IpLearn, LLC, v. Blackboard, Inc.*, C.A. No. 1:11-CV-00876-RGA, filed Jul. 1, 2014, pp. 1-4.
Exhibit L, Declaration of Allan A. Kassenoff, *IpLearn, LLC, v. Blackboard, Inc.*, C.A. No. 1:11-CV-00876-RGA, filed Jul. 1, 2014, pp. 1-7.
Exhibit M, Declaration of Allan A. Kassenoff, *IpLearn, LLC, v. Blackboard, Inc.*, C.A. No. 1:11-CV-00876-RGA, filed Jul. 1, 2014, pp. 1-51.
Exhibit N, Declaration of Allan A. Kassenoff, *IpLearn, LLC, v. Blackboard, Inc.*, C.A. No. 1:11-CV-00876-RGA, filed Jul. 1, 2014, pp. 1-2.
Exhibit O, Declaration of Allan A. Kassenoff, *IpLearn, LLC, v. Blackboard, Inc.*, C.A. No. 1:11-CV-00876-RGA, filed Jul. 1, 2014, pp. 1-3.
IpLearn's Motion for Summary Judgment, C.A. No. 1:11-CV-00876-RGA, filed Jul. 1, 2014 and Jul. 11, 2014, pp. 1-40.
Blackboard Inc.'s Reply Brief in Furth Support of Its Motion for Reconsideration, C.A. No. 1:11-CV-00876-RGA, filed Jul. 10, 2014, pp. 1-9.
IpLearn's Response Brief in Opposition to Blackboard's Motion for Summary Judgment, C.A. No. 1:11-CV-00876-RGA, filed Aug. 7, 2014, pp. 1-44.
Exhibit 5, IpLearn's Response Brief in Opposition to Blackboard's Motion for Summary Judgment, C.A. No. 1:11-CVf-00876-RGA, filed Aug. 7, 2014, pp. 1-5.
Exhibit 6, IpLearn's Response Brief in Opposition to Blackboard's Motion for Summary Judgment, C.A. No. 1:11-CVf-00876-RGA, filed Aug. 7, 2014, pp. 1-6.
Exhibit 14, IpLearn's Response Brief in Opposition to Blackboard's Motion for Summary Judgment, C.A. No. 1:11-CVf-00876-RGA, filed Aug. 7, 2014, pp. 1-17.
Blackboard, Inc.'s, Supplemental Exhibits 23 through 29 to IpLearn's Response Brief, C.A. No. 1:11-CV-00876-RGA, filed Aug. 7, 2014, pp. 1.
Exhibit 27, IpLearn's Response Brief in Opposition to Blackboard's Motion for Summary Judgment, C.A. No. 1:11-CVf-00876-RGA, filed Aug. 7, 2014, pp. 1-31.
Blackboard Inc.'s Reply Brief in Further Support of Its Motion for Summary Judgment, C.A. No. 1:11-CV-00876-RGA, filed Aug. 21, 2014, pp. 1-23.
1pLearn's Reply in Support of Its Motion for Summary Judgment, C.A. No. 1:11-CV-00876- RGA, filed Aug. 21, 2014, pp. 1-20.
*IpLearn, LLC, v. Kenexa Corporation et al, IpLearn, LLC, v. Blackboard, Inc., IpLearn, LLC, v. K12, Inc.*, Memorandum Opinion, C.A. No. 1:11-CV-00876-RGA, filed Oct. 22, 2013, pp. 1-16.
*IpLearn, LLC, v. Kenexa Corporation et al, IpLearn, LLC, v. Blackboard, Inc., IpLearn, LLC, v. K12, Inc.*, Memorandum Opinion, C.A. No. 1:11-CV-00876-RGA, filed Feb. 10, 2014, pp. 1-18.
*IpLearn, LLC, v. K12, Inc.*, Memorandum Opinion, C.A. No. 1:11-CV-01026-RGA, filed Dec. 17, 2014, pp. 1-15.
*IpLearn, LLC, v. K12, Inc.*, Memorandum Order, C.A. 1:11-CV-01026-RGA, filed Dec. 17, 2014, pp. 1.
*IpLearn, LLC, v. Blackboard, Inc., IpLearn, LLC, v. K12, Inc.*, Memorandum Order, C.A. No. 1:11-CV-00876-RGA, filed Aug. 26, 2014, pp. 1-3.
Blackboard Inc.'s Answering Brief in Opposition to 1pLearn, LLC's Motion for Summary Judgment, C.A. No. 11-876 (RGA), filed Jul. 31, 2014, pp. 1-31.

\* cited by examiner

COMPUTER-AIDED LEARNING SYSTEM AND METHOD

CROSS-REFERENCE TO RELATED APPLICATIONS

This is a continuation of U.S. Pat. No. 6,688,888, issued on Feb. 10, 2004, which is a continuation of U.S. Pat. No. 6,139,330, issued on Oct. 31, 2000, which is a continuation-in-part application of the following patent:

Ser. No. 08/618,193, filed on Mar. 19, 1996, U.S. Pat. No. 5,779,486, entitled, Methods and apparatus to assess and enhance a student's understanding in a subject (the "Test Application");

Ser. No. 08/633,582, filed on Apr. 17, 1996, U.S. Pat. No. 5,743,746, entitled, Reward enhanced learning system and method (the "Reward Application"):

Ser. No. 08/664,023, filed on May 28, 1996, entitled, U.S. Pat. No. 5,727,951, Relationship-based computer-aided-educational system (the "Relationship Application");

Ser. No. 08/675,391, filed on Jul. 2, 1996, U.S. Pat. No. 5,863,208, entitled, Learning system and method based on review (the "Review Application"); and Ser. No. 08/707,189, filed on Sept. 3, 1996, U.S. Pat. No. 5,743,743, entitled, Learning method and system that restricts entertainment (the "Restrict Application").

All of the above allowed applications and patents are incorporated by reference into this specification.

BACKGROUND OF THE INVENTION

The present invention relates generally to learning and more particularly to using a computer to enhance learning.

The foundation of a vibrant society depends on skilled workers. To strengthen this foundation, every year the U.S. Government with the private industry have poured billions and billions of dollars to improve on learning systems and methods. Money has been spent in areas such as laboratory facilities, educational materials, teacher recruitment and retention, and others. However, for decades, the way to test a student has remained the same; learning has been treated typically as a reward in itself; a fixed syllabus usually controls the educational process of a subject without taking into account students' individual progress; what students have learnt are rarely selectively reviewed; and typically, the students can access non-educational materials when they should be using computers to learn.

It should be obvious that we need methods and systems that are based on computers to remedy the above deficiencies.

SUMMARY OF THE INVENTION

In one embodiment, the present invention provides a learning method and system that assess and enhance a student's or a user's understanding in a subject. Based on the user's understanding, individually-tailored tests are generated, whose difficulties can be geared towards the user's level of understanding in the subject. The user not only can use the tests to prepare for an examination, but can also use the tests to learn the subject.

In another embodiment, the invented method and system are based on the latest test results from the latest test taken by the user on the subject, which can be divided into line-items. Each line-item covers one area in the subject. In yet another embodiment, at least one line-item is more difficult than another line-item. The latest test includes questions from different line-items.

In one embodiment, the invented system includes a score generator coupled to a recommendation generator. In one embodiment, the recommendation generator includes an inference engine; and in another embodiment, the recommendation generator includes a pre-requisite analyzer. The recommendation generator can be coupled to a report generator and a question generator.

In one embodiment, the score generator accesses the user's latest test result and his prior-to-the-latest test results from a storage medium to generate an overall score for each set of questions related to the same line-item. In one embodiment, the prior-to-the-latest test results are test results from the test immediately before the latest test. In another embodiment, each overall score reflects the user's degree of forgetfulness as a function of time for that group of questions. Based on the calculated overall scores, the score generator updates information in the storage medium to include the latest test results.

Both the pre-requisite analyzer and the inference engine in the recommendation generator can generate recommendations based on the user's test results. The pre-requisite analyzer accesses pre-requisite rules, which, based on the complexity levels of the line items, determines a complexity-hierarchy among the line-items. Then, applying the complexity-hierarchy to the test results, the pre-requisite analyzer determines the user's level of understanding in the subject to provide recommendations for the user which, for example, can be providing suggestions to the user as to the line-item to work on.

The inference engine accesses a set of relationship rules that define relationship among the line items and the subject. Then applying the set of relationship rules to the user's test results, the inference engine determines the user's level of understanding in the subject to provide recommendations for the user.

If there is any conflict among one or more relationship rules with the contents in the test results, or if there is any conflict among two or more relationship rules, the inference engine can resolve it. Resolving such conflicts helps to ensure a consistent assessment of the user's understanding in the subject.

In one embodiment, as shown in FIG. 8, the inference engine can resolve relationship rules that are in conflict, or are not fully consistent. For example, Rule 1: If a student is weak in algebra, then the student is weak in geometry.

Rule 2: If a student is weak in geometry, then the student is weak in trigonometry.

The inference engine, based on rules 1 and 2, derives Rule 3:

Rule 3: If a student is weak in algebra, the student must be weak in trigonometry. Conversely, if a student is strong in trigonometry, the student must be strong in algebra.

Rule 4: A student strong in trigonometry may not be strong in algebra. The derived rule 3 is in conflict with rule 4. Then, the inference engine derives and adds the following rule as one of the relationship rules:

Rule 5: If a student is strong in trigonometry, but there is no data, latest or prior-to-the-latest, to show the student's ability in algebra, the student should work on algebra next. In the future, this new rule takes precedence over the conflicting rules. With rule 5 applied before rules 1 and 2, rule 3 will not be derived.

Another way to resolve the conflict is to reshuffle the order of application of the rules. For the above example, one way to resolve the conflict between rule 4 and rule 3 is to apply rule 4 before applying rules 1 and 2.

In another embodiment, the inference engine can resolve one or more relationship rules in conflict with the contents in a test results table, such as overall scores. In one embodiment, rules in conflict are disabled. For example with the above rule 1 to rule 3 still active:

The student's overall scores indicate that the student is strong in trigonometry, but weak in algebra. Such scares are in conflict with rule 3, Under such a situation, the inference engine would disable rule 1 for this student. Without rule 1, the engine will not be able to derive rule 3, and they will be no rules in conflict with the overall scores.

Reshuffling the rules, such as rules 1, 2 and 4 above, can also resolve the conflict among the rules and the contents in the test results table, such as the overall scores.

Another way to resolve conflicts is to associate a credit with each rule. The credit is advanced by a certain amount if its corresponding rule is used to generate a recommendation. However, the credit of a rule is decremented by another amount if the rule is found to be in conflict with another rule or with the contents in the test results table. In one embodiment, the increment and the decrement amount are the same. In another embodiment, either the increment or the decrement amount is zero. The order of application of rules is based on the credits of the rules—a rule with a larger credit is applied before a rule with a smaller credit.

Yet another approach to resolve a conflict with the contents in the test results table is to add a new rule, which has precedence over non-new rules. Based on the above example, to prevent conflict with rules 1-3, the following new rule is added;

If a student is strong in trigonometry, but weak in algebra, the student should work on algebra, In one embodiment, the report generator accesses a report format. Based on the recommendations and the report format, the report generator generates a report, which can provide assessment of the user's understanding in line-items of the latest test and the prior-to-the-latest tests, and which can provide action items to improve on the user's understanding in the subject.

The question generator, based on the recommendations, generates a number of questions, which, in another embodiment, can be categorized into at least two line items—one being the one suggested by the recommendations, and the other being different from the one suggested by the recommendations. The user can take this new set of questions to further enhance his understanding in the subject.

In one embodiment, the invented system and method enhance a user's understanding in a subject through associating the subject's different areas that the user has studied.

The subject can be divided into line-items and relationship-items. Each relationship-item covers areas that relate two or more items. The items include learnt and un-learnt items, with a learnt item being an item that the user has achieved a preset level of learning, and with an un-learnt item being an item that the user has not yet achieved a preset level of learning.

In one embodiment, the recommendation generator also selects and classifies the items. That embodiment includes a learning-material generator for generating learning materials for the user.

In one embodiment of the invented method, first, the recommendation generator selects one un-learnt item. After the selection, the learning-material generator generates learning materials for the user to learn the selected item, and the system assesses the user's learning prowess in the selected item. If the assessment on the selected un-learnt item is satisfactory, then the recommendation generator classifies one or more relationship-items to be learnt as un-learnt items, with each classified relationship-item relating the selected item with one or more learnt items. The recommendation generator can also re-classify the selected item as a learnt item. Then, another un-learnt item can be selected, which can be a line-item, or a relationship-item, The process can continue on until all of the items have been learnt. At that point, the user has mastered the subject.

There are different ways for the recommendation generator to select an un-learnt item. In one embodiment, the recommendation generator selects an un-learnt line-item or an un-learnt relationship-item, depending on a value set by an instructor. If the un-learnt item is a line-item, the process to select a line-item can be based on the difficulty level of the line-item; if the un-learnt item is a relationship-item, the selection process can be based on the difficulty level of the relationship-item, the time the relationship-item was classified as an un-learnt item, and/or whether the user has previously failed to learn the relationship-item.

For the learning materials, in one embodiment, the learning material is includes questions. In another embodiment, the learning material does not include questions.

One embodiment of the invented system and method provide users dynamic reviews. After a user has learnt certain areas in a subject, summarized learning materials on those areas can be selectively generated for the user so as to reinforce the user's learning in the subject through reviews. Unlike prior systems, the reviews in the present invention can be dynamic; they can be specifically tailored to the needs of individual users, or the characteristics of the subject.

In one embodiment, the present invention selects an un-learnt item, and generates detailed learning materials for it. Then a learnt item is selected, for example, based on one or more learnt-item-selection rules, depending on factors such as the time elapsed from the time when the user learnt that item, the level achieved by the user in learning that item, its difficulty level, whether that learnt item is related to the selected un-learnt item, and whether that learnt item has been selected before. Then, the invention generates summarized-learning materials on the selected learnt item for the user to review.

Different materials are applicable for learning. For example, the summarized-learning materials may or may not include questions.

For an un-learnt item, after presenting the generated learning material to the user, the present invention can assess the user's understanding in the item. If the assessment is satisfactory, the un-learnt item can be re-classified as a learnt item.

In another embodiment, the present invention accesses an item probability value to select an item. If the item is an un-learnt item, the invention can generate detailed learning materials for the user; and if the user is successful in learning the materials, the invention can re-classify the item as a learnt item. If the item is a learnt item, the invention can generate summarized learning materials for the user. The invention then can repeat and select another item.

In one embodiment, the present invention enriches a user's learning process through individualizing rewards. The invention allows an instructor or a user to set when and what to reward. The invention also allows a user or the user to delay receiving the reward.

In one embodiment, the invented system teaches the user a subject. The subject is divided into line-items, with at least one line-item being more difficult than another line-item. The instructor, such as the user's teacher, guardian or parent, enters his password into the invented system. If the password matches the instructor's password stored in the system, the instructor has gained access into the system, and can set each line-item where there should be a milestone. The system also can provide a list of pre-selected rewards for the instructor to pick the reward at each milestone. The list or a part of the list can depend on the user's preference. The system can then generate a milestone/reward table, capturing the instructor's inputs.

In one embodiment, the recommendation generator accesses the table, and determines if the user has reached any one of the milestones set by the instructor. This determination process can be accomplished in a number of ways; for example, it can be done through one or more rules pre-stored in the system. Such information can then be transmitted to a reward determinator.

The reward determinator based on the information in the reward table can determine the type of reward for the user who has reached a milestone. In one embodiment, there are two types of rewards. The first type is a point system, and the second type is an actual reward. The user can accumulate points or get an actual reward. It would be up to the user to decide. If the user's preference is to pick an actual reward, the user can postpone receiving the reward. If the user's preference is to pick the point system, his points can be accumulated as he gets more points through reaching more milestones.

In one embodiment, the report generator accesses the user's preference and the milestone reached by the user from the reward determinator. The generator stores the milestone-reached in the storage medium, and accesses from the storage medium the history of the milestones reached by the user. In one embodiment, based on the accessed information, a report is generated every time the user reaches a milestone. In another embodiment, the instructor can query the report generator to find out about the user's performance. Based on the report, if the user picks points as rewards, then based on the accumulated points, rewards can be set by the instructor accordingly.

If the user does not want to postpone getting the reward, a reward generator generates the reward for the user. Depending on the type of reward, in one embodiment, the reward generator accesses the reward from a reward storage medium; and in another embodiment, the reward generator accesses the reward from a network.

After the user has claimed the reward, the system can ask for the user's feedback as to his interest in the reward. This information is also sent to the report generator to be presented in the report so that the instructor knows whether she should adjust the rewards for future milestones.

If the user has postponed receiving his reward and later decides to re-claim it, he can enter his password into the system. If the password matches the user's password stored in the system, the user can re-claim his postponed rewards.

In one embodiment, the invention provides rewards when the user has demonstrated understanding in the subject through tests, not just when the system has presented instructional materials. That embodiment requires feedback from the user, with rewards reflecting on the user's understanding In one embodiment, the invented method and system help a user focus on study materials by restricting him from freely enjoying entertainment materials on the computer. With such an invention, the user is not distracted by entertainment materials on the computer when he should be working on the study materials. Even if he wants to play, he has to finish studying first.

In one embodiment, the entertainment materials are presented through an entertainment program, and the study materials are presented through a study program.

In one embodiment, the invented system includes an access filter between the programs and a device. The entertainment program needs the device to entertain. A controller controls the access filter to automatically restrict the coupling between the device and the entertainment program, but simultaneously allow the coupling between the device and the study program.

Different entertainment materials typically require different types of devices to entertain. Some examples of devices required by entertainment materials include speakers, a position-pointing device such as a joy-stick, an output device, a storage medium and a circuit board. The circuit board can be used to couple to video-signals, audio-signals or other digital or analog signals. The video-signals can be television signals.

In one embodiment, the access filter includes a device driver.

Under a predetermined condition, the controller removes the restriction automatically to allow the device to couple to the entertainment program. This can be done through a token system. Under the predetermined condition, the user is given a token, which the user can use to remove the restriction. With the restriction removed, the user can enjoy the entertainment materials.

These predetermined condition can be based on one or more factors, such as the amount of time the user has been working on the study materials, the user's performance in the study materials, and the time of day. In one embodiment, one predetermined condition is a user has claimed a corresponding reward.

Other aspects and advantages of the present invention will become apparent from the following detailed description, which, when taken in conjunction with the accompanying drawings, illustrates by way of example the principles of the invention.

However, those skilled in the art will readily appreciate that the detailed description given herein with respect to the figures is for explanatory purposes as the invention extends beyond these limited embodiments.

DETAILED DESCRIPTION OF THE INVENTION

Figure 1:
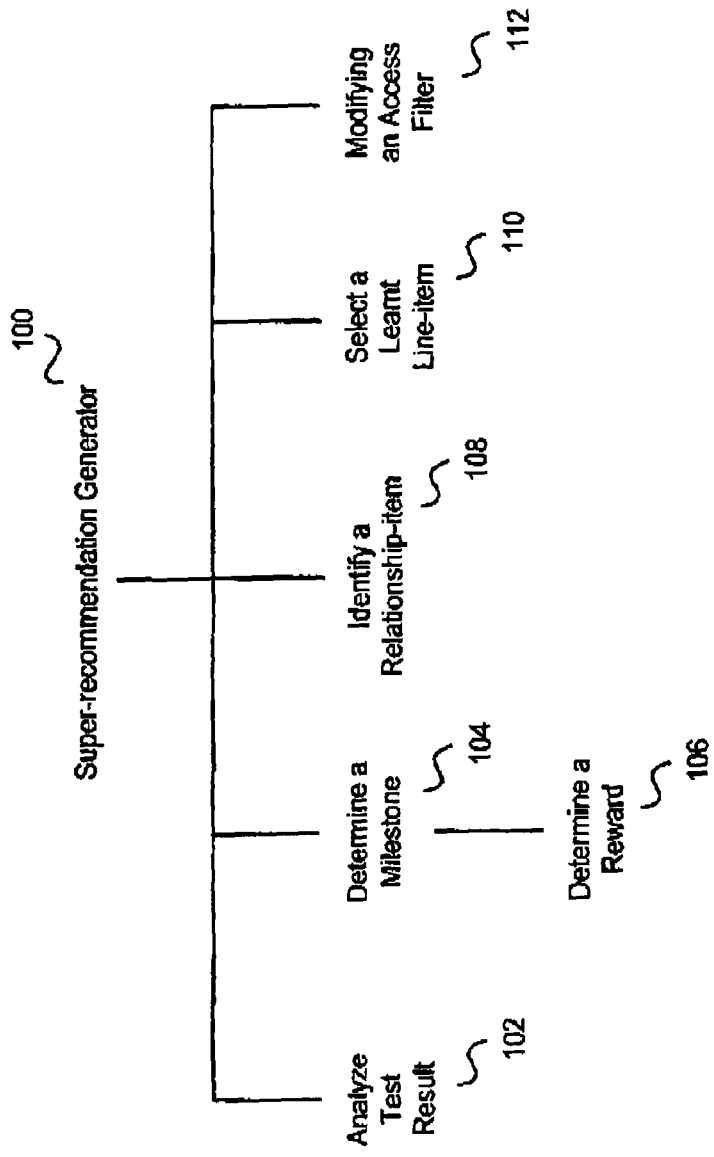
FIG. 1 illustrates one embodiment of the present invention.
Figure 2:
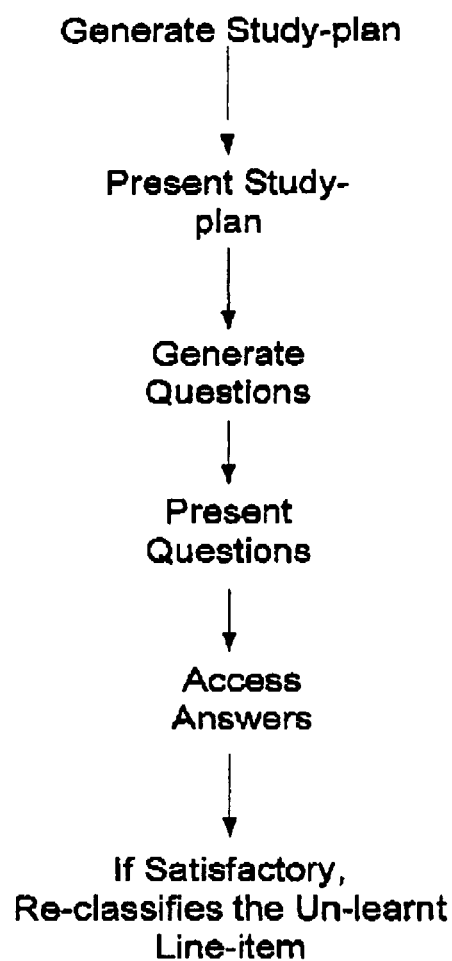
FIG. 2 shows a process to generate a detailed learning material according to an embodiment in the present invention.
Figure 3:
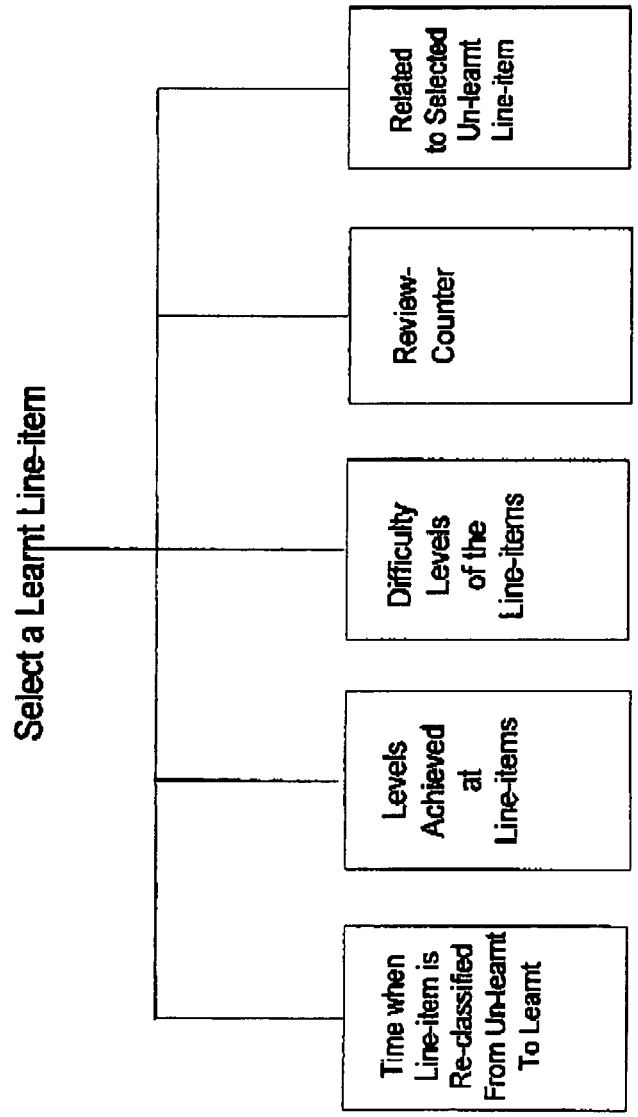
FIG. 3 shows a number of criteria to select a learnt line-item according to different embodiments in the present invention.
Figure 4:
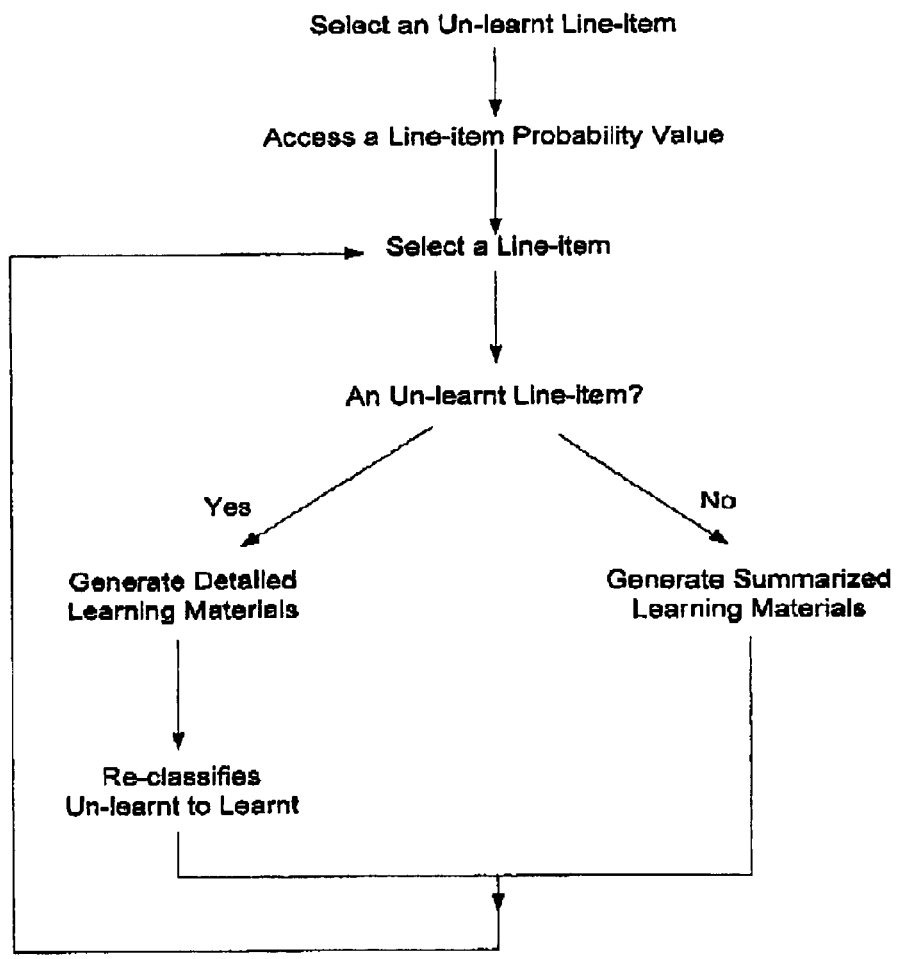
FIG. 4 shows a process to implement another embodiment of the present invention.
Figure 5:
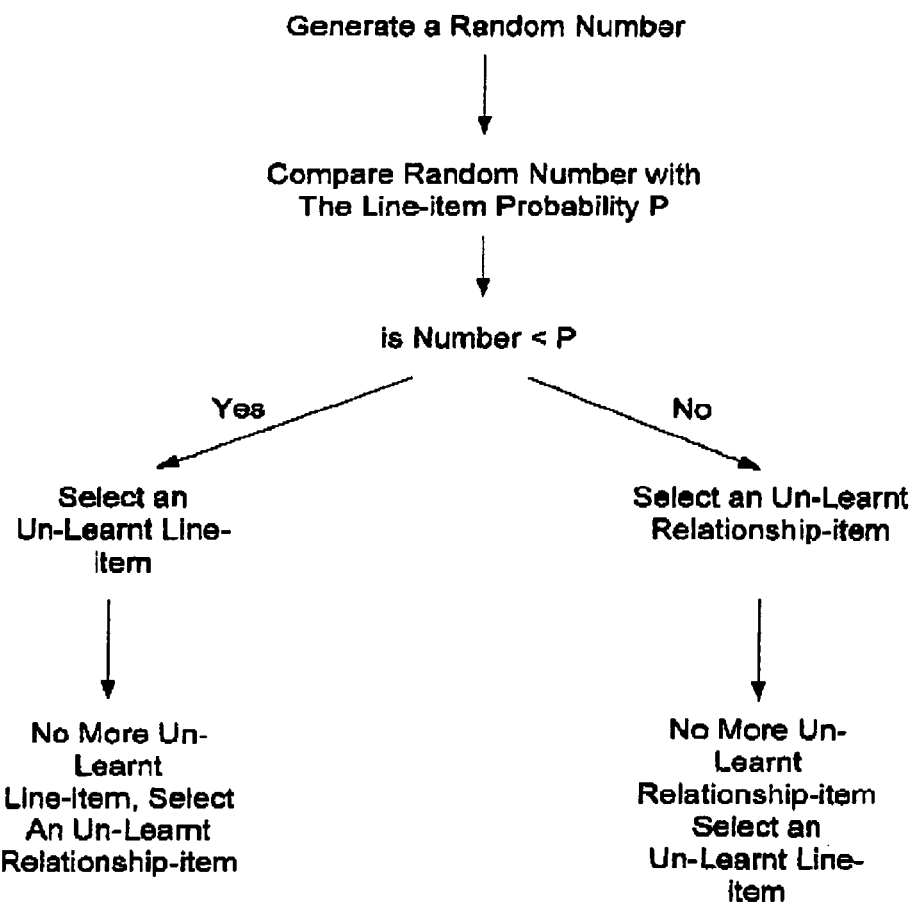
FIG. 5 shows a process to select an un-learnt line-element or a relationship-item according to an embodiment in the present invention.
Figure 6:
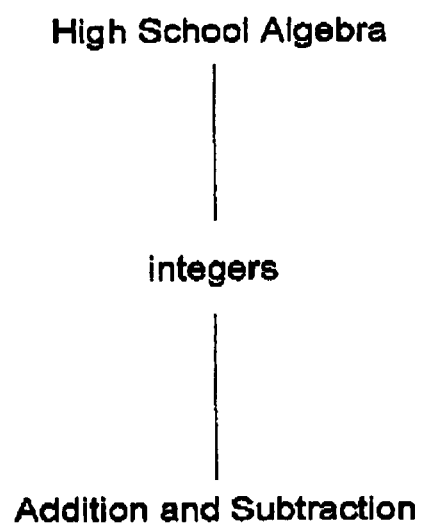
FIG. 6 shows different areas of a subject according to an embodiment in the present invention.
Figure 7:
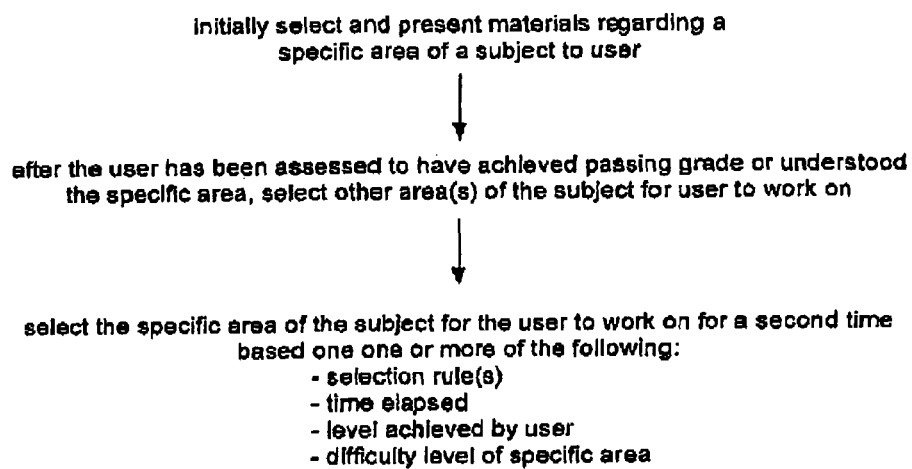
FIG. 7 shows another embodiment of the present invention.
Figure 8:
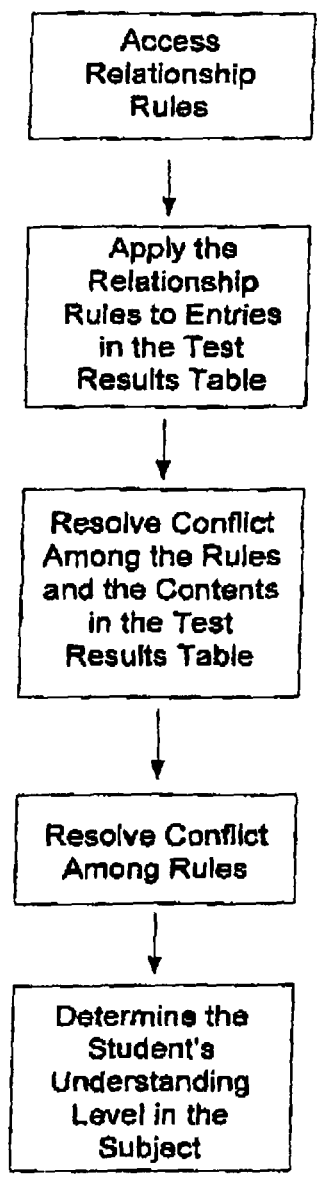
FIG. 8 shows another embodiment of the present invention.
Figure 9:
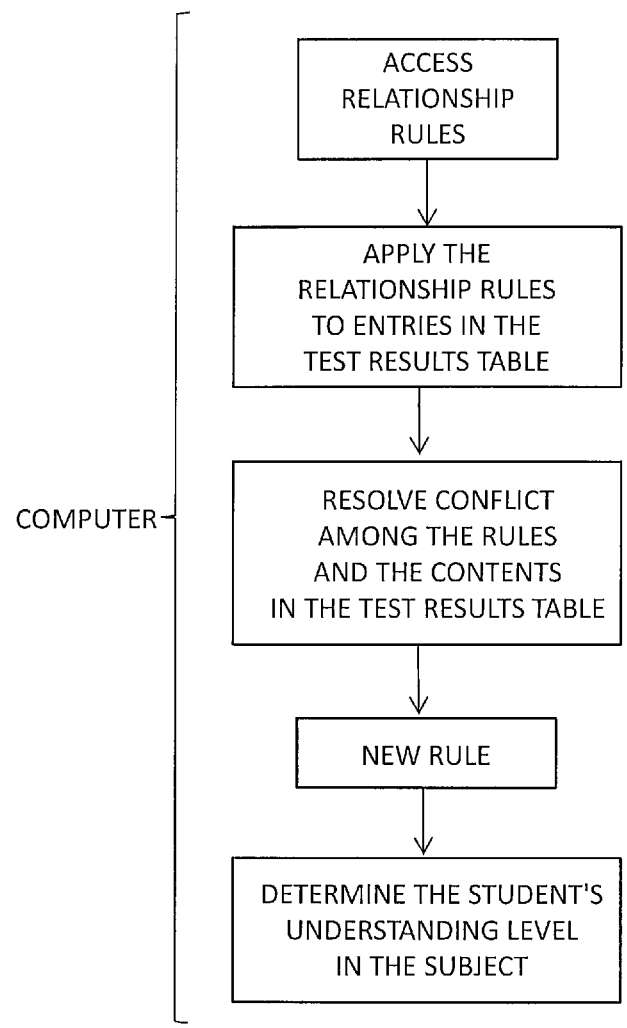
FIG. 9 shows another embodiment of the present invention.
Figure 10:
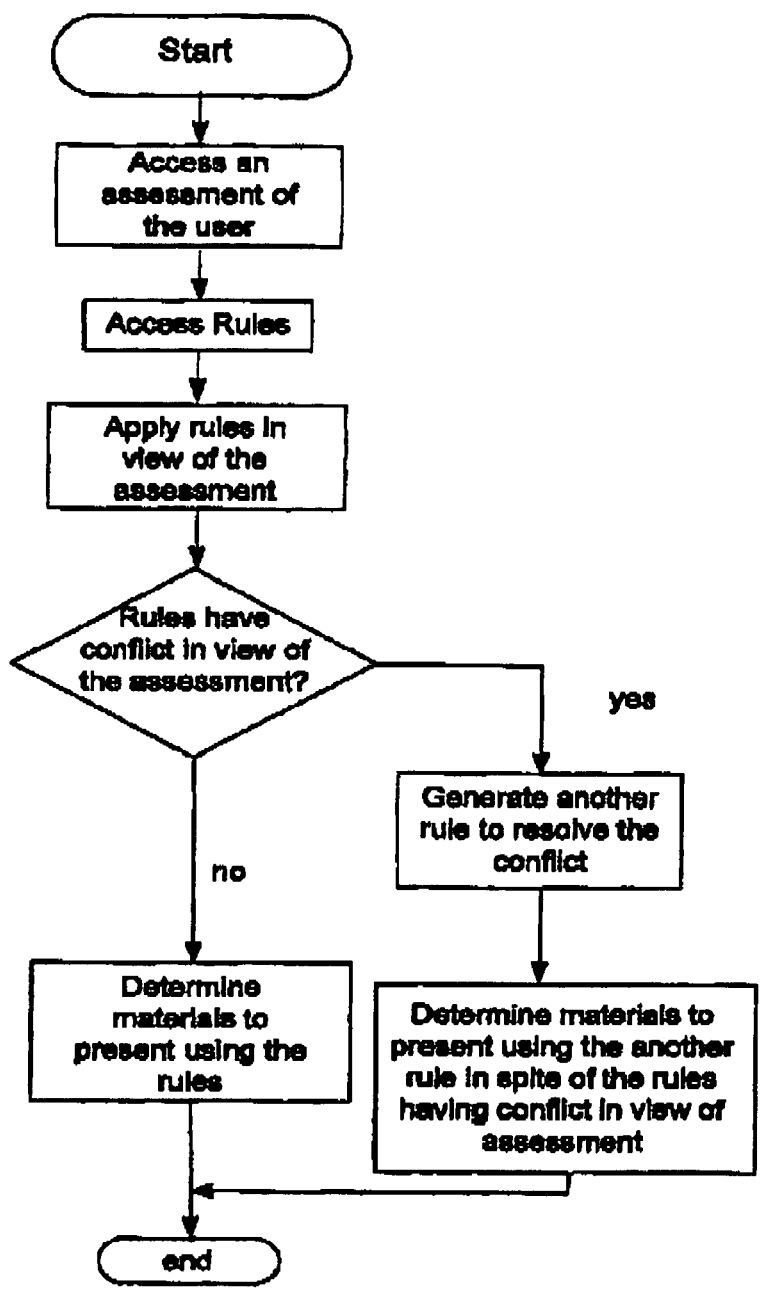
FIG. 10 shows another embodiment of the present invention.

FIG. 1 shows one embodiment of the invention including a super-recommendation generator 100 for implementing a computer-aided learning method to help a student or a user learn a subject. The generator 100 in general is for enhancing the learning experience of the user, and can be implemented in software, firmware, hardware or some combination of the above.

In one embodiment, the subject can be divided into items, including one or more relationship-items, with each relationship-item relating two or more items. The items can include learnt and un-learnt items, with a learnt item being an item that the user has achieved a preset level of learning, and with an un-learnt item being an item that the user has not yet achieved a preset level of learning.

In one embodiment, the super-recommendation generator 100 performs a number of functions, including the following:

assessing a user's understanding in a subject as, for example, described in the Test Application;

rewarding the user who has reached one or more milestones in the subject as, for example, described in the Reward Application;

furthering the user's understanding in the subject through relationship learning, as, for example, described in the Relationship Application;

reinforcing the uses understanding in the subject through reviews, as, for example, described in the Review Application; and restricting the user from enjoying entertainment materials under certain condition, with the entertainment material requiring a device to fulfill its entertainment purpose, as, for example, described in the Restrict Application.

One embodiment of the super-recommendation generator is configured to perform the following operations:

analyzing (102) the user's prior-to-the-latest and the latest test results to assess the user's understanding in the subject, as, for example, described in the Test Application;

determining (104) whether the user has reached a milestone, as, for example, described in the Reward Application;

determining a reward (106) for the user that has reached a milestone, with the reward depending on the user's preference, as, for example, described in the Reward Application;

identifying (108) a relationship-item to be learnt, with the identified relationship-item relating an item and a learnt item, as, for example, described in the Relationship Application;

selecting (110) a learnt item to be reviewed, as described, for example, in the Review Application; and modifying (112) an access filter to restrict coupling between the device and the entertainment materials, with the restriction removed to allow coupling between the device and the entertainment materials under a predetermined condition.

In another embodiment, the super-recommendation generator is configured to perform only some of the operations, with the subject categorized accordingly. For example, the generator 100 is configured not to perform the function of modifying an access filter. In another example, the generator 100 is configured to assess (102), identify a relationship-item (108) and reinforce through reviews (110). In yet another example, the generator 100 is configured to perform similar functions as the previous example, except for the function of assessment, in which the generator 100 analyzes the user's test results using a set of analysis rules to determine the user's understanding level in the subject. In a further example, the super-recommendation generator is configured to assess (102), determine (104) if the user has reached a milestone, and determine (106) a reward; for this example, the subject can be categorized to include one or more milestone.

In one embodiment, a system implements an embodiment of the present invention preferably in software and hardware. The system includes a server computer and a number of client computers. Each client computer communicates to the server computer through a dedicated communication link, or a computer network.

The client computer typically includes a bus connecting a number of components, such as a processing unit, a main memory, an I/O controller, a peripheral controller, a graphics adapter and a network interface adapter. The I/O controller is connected to components, such as a hard disk drive. The peripheral controller is connected to components, such as a keyboard. The graphics adapter is connected to a monitor and the network interface adapter is connected to the network. The network includes the internet, an intranet, the world wide web and other forms of networks. Different components of the present invention can be in different elements. And, one or more of the components, such as the recommendation generator, can be implemented on a circuit, such as a field-programmable-gate-array, where the entire program embodying one or more of the components are burnt into the circuit.

In one embodiment, as long as study materials in an area have been presented to a user, it is assumed that the user has mastered the area.

In another embodiment, after presenting to the user study materials in an area, questions are generated and presented to the user. Typical, users gain a better understanding on a subject through actively working on questions, than just through passively reading study materials.

Regarding reinforcing through reviews, in one embodiment, an area is repeated to be learnt depends on the time elapsed from the time when the area was previously learnt. The selection process dis-favors the area that has just been learnt because presumably the area is still fresh in the user's mind. As time passes, the user's memory begins to fade, and should be refreshed. Typically, a user starts to forget what he has learnt a number of weeks, such as three, after he has learnt it. Thus, in one embodiment, the selection process starts favoring reviewing the area that has been learnt three weeks ago.

In another embodiment, the selection process dis-favors the area that has been learnt long time ago because presumably the user has learnt other more difficult area during the interim period. This is similar to a user learning a subject in a semester. After the end of the semester, the user stops reviewing the subject, and starts studying a more difficult subject. Typically, a semester is about three months or twelve weeks. Thus, in one embodiment, the selection process begins to dis-favor reviewing the area that has been learnt more than twelve weeks ago.

In one embodiment, the above elapsed time dependency in selection is embedded in a rule that is represented by the following equation:

$$\text{Weight } w(t)=k*e^{-at}*(1-e^{-t})^b$$

where k, a, and b>0. Here the time t starts counting from the time when the area is learnt. Initially, the weight function w(t) increases as time t increases, peaking with time being equal to $\ln((a+b)/a)$. From that point onwards, the function decreases as time further increases. The values for a and b are chosen to determine the position of the peak, and the value for k is used to adjust the variance of the function.

The bigger the weight of an area, the better the chance for that area to be selected. As an example, the weight is chosen to peak when t is between three weeks (or 21 days) and twelve weeks (or 84 days), which averages to 53 days. Thus, w(t) peaks around 53 days, implying that;

$$\ln((a+b)/a)=53.$$

The above exponential weight function is just an example representing the dependency on time. Other weight functions are also applicable, such as the Chi's Square functions.

In another embodiment, selecting an area that previously has been learnt depends on the mastery level achieved by the user. The lower the grade or the level system should reinforce the user's weaker areas. Again, this can be represented by a weight function, which depends on the mastery level achieved by the user.

In yet another embodiment, selecting an area that previously has been learnt depends on the characteristics of the area, such as the difficulty level of the area. The more difficult the area, the higher the probability to select that area because it is more likely for the user to be weak in that area, or that area is more significant than other areas. Again, the dependency on difficulty level can be represented by a weight function, which tracks the difficulty level of the area.

For another different embodiment, selecting a previous area that has been learnt depends on whether that area is related to the most recently selected area to learn. This embodiment favors a previous area that is related to the most recently selected area because the user may form the relationship himself through working on both of them.

For example, the most recently selected area just learnt is differentiating exponential functions. Then one previous area to review may be the hyperbolic sine and cosine functions. The idea is for the user to form the relationship himself that differentiating hyperbolic sine is the hyperbolic cosine, and vice versa. Typically, a user enjoys learning a subject and remembers it better if he thinks that he, by himself, has developed some insights in the subject.

In one embodiment, an inference engine generates recommendation for a user. First, the engine accesses a set of relationship rules from an analysis-rule-storage medium. These rules define the relationship among different areas in a subject, such as the relationship among line-items, minor-topics, major-topics and the subject. Then the inference engine applies the relationship rules to entries in a test results table to determine the user's understanding level in the subject. In one embodiment, each relationship rule is of the following format:

(consequence, condition1, condition2, . . . ).

If all the conditions are satisfied, the consequence is true. If any one of the conditions is not satisfied, the consequence is false.

These rules can be used in many different ways. One way is an if-then-else statement within a program, such as:

If the overall-score of a line-item (such as integer addition/subtraction or int +/−) at a specific complexity level >90 then grade := A else if overall-score >75 then grade := B else if overall-score >60 then grade := C else if overall-score >50 then grade := D else grade := F.

If the grade of (Int +/−)= A and the grade of (Int *,/)= A and the grade of (Int Factorization)= A and the grade of (Int common divisor) is better than or equal to B then the grade of Int := A.

In the above examples, the symbol ":=" denotes an assignment operator; also a grade is similar to a user's mastery level in that item. In another embodiment, a grade is transformed to a description in terms of mastery level, such as weak or strong in that item.

In one embodiment, the relationship rules also determine a number of factors, such as (1) the grade in each line-item of a minor-topic before one is considered strong in that minor-topic; (2) the grade in each minor-topic of a major-topic before one is considered strong in that major-topic; and (3) the grades in each major-topic of the subject before one is considered strong in that subject. Based on the relationship rules, the inference engine can infer not only how well the user performs in a specific complexity level of a line-item, but also how well the user performs in a minor-topic, or a major-topic, or even the subject itself.

In another embodiment, each relationship rule is represented in a table of attributes with one attribute being the consequence and the others conditions. As an example, for the line-item at the specified difficulty level, the grades or consequence and the conditions at that difficulty level are:

| Grade/Consequence | Condition |
| --- | --- |
| A | Overall score of the line item > 90 |
| B | 90 >= Overall score of the line item > 75 |
| C | 75 >= Overall score of the line item > 60 |
| D | 60 >= Overall score of the line item > 50 |
| F | Overall score of the line item <= 50 |
| Consequence | |
| G(Int +/−) := A | G(Int +/−) at level 8 = A. |
| G(Int) := A | G(Int +/−) = A, G(Int *, /) = A, G(Int factorization) = A, G (Int common divisor) is better than or equal to B. |

In the above example, the term "G" denotes "the grade of."

In yet another embodiment, the relationship rule is represented by a set of Horn's clauses in a logic programming language, such as prolog. For example, G(Int +/−) is A if Overall-score (Int +/−)>90

G(Int +/−) is B if 90>= Overall-score (Int +/−)>75

G(Int +/−) is C if 75>= Overall-score (Int +/−)>60

G(Int +/−) is D if 60>= Overall-score (Int +/−)>50

G(Int +/−) is F if Overall-score (Int +/−)<=50

G(Int) is A if G(Int +/−) is A and G(Int *,/) is A and G(Int factorization) is A and G(Int Common Division) is better than B.

G(Int) is A if G(Int +/−) is A and G(Int *,/) is A and G(Int factorization) is A and G(Int Common Division) is B.

Some examples of relationship rules describing the relationship among different line-items, or minor-topics or major-topics are as follows:

Weak in algebra implies weak in geometry;
Weak in integers implies weak in fraction;
Weak in algebra implies weak in trigonometry; and
Weak in geometry implies weak in analytic geometry.

Typically, relationship rules are based on expert knowledge on general relationship among different areas in a subject. The way to generate the rules to form the relationships should be well known to experts in the subject—the more knowledgeable the expert, the more complete the set of rules.

In the above examples, the inference engine operates on the test results table to generate recommendations. In one embodiment, the engine operates on latest overall-scores and prior-to-the-latest overall scores. For example, one latest overall score indicates that the user is very proficient in fractional +/− without common denominator, and one prior-to-the-latest overall score indicates that the user is very proficient in fractional *,/ with integer. Based on the two overall scores, the inference engine can provide a recommendation that the user should work on fractional *,/ without common denominator.

Note that the present invention does not require the user to take many tests. If the user has not done enough questions, then the inference engine would indicate that she has only reached a certain state, such as passing only a minor-topic, not a major-topic of a subject.

Note that in one embodiment, computer can be defined as a machine that can perform a computable function, which can be defined as a function that can be performed by a Turing machine or its equivalence.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A computer-implemented method for helping a user learn, the method comprising:
   (a) presenting, by a display, materials to help the user learn, the display being coupled to a computing device, which comprises a rule storage medium, an assessment table including assessment attributes regarding users, and a recommendation generator;
   (b) retrieving, by the recommendation generator from the rule storage medium, at least two rules from a group of rules, with at least one of the rules being related to a subject, to help determine additional materials to present to the user,
   wherein each of the two rules includes a consequence and one or more conditions,
   wherein if any condition of each of the two rules is not satisfied, the consequence of the corresponding rule is false,
   wherein each of the two rules is represented in a table of attributes, with one attribute being the consequence of the rule and with one or more other attributes being the one or more conditions of the rule,
   wherein the table of attributes is stored in the rule storage medium, and
   wherein in retrieving the at least two rules, the consequence and the one or more conditions of each of the two rules are retrieved from the table of attributes in the rule storage medium;
   (c) determining a recommendation, by the recommendation generator, based on at least a rule from the table of attributes in the rule storage medium, for the additional materials to present via the display, after the materials have been presented at (a); and
   (d) selecting, by the recommendation generator, at least some of the materials presented at (a) to the user via the display, for a further time to refresh the user's memory of the materials,
   wherein (c) includes:
      analyzing at least the two rules to determine an inference, wherein the inference includes a consequence and at least one condition;
      accessing at least two assessment attributes from the assessment table;
      determining the at least two assessment attributes from the assessment table being in conflict with the consequence and the at least one condition of the inference; and
      generating a new rule, which is added to the group of rules in the rule storage medium and which takes precedence over the at least two rules, in view of the conflict, to determine the recommendation for the additional materials to present via the display.

2. The computer-implemented method as set forth in claim 1, wherein at (d) the selecting of at least some of the materials presented at (a) for presentation to the user for the further time occurs after the additional materials determined at (c) have been presented.

3. The computer-implemented method as recited in claim 1, wherein the method further comprises having at least some of the presented materials transmitted via a network to the display to be presented to the user, and wherein the network includes a private network and/or a public network.

4. The computer-implemented method as recited in claim 1, wherein the at least some of the materials presented to the user at (a) are selected at (d) for presentation to the user for the further time depending on a time elapsed from when the materials are presented at (a).

5. The computer-implemented method as recited in claim 4, wherein the at least some of the materials presented to by the user at (a) can be repeatedly selected for presentation to the user, but if the time elapsed is more than a predetermined duration of time, the at least some of the materials presented at (a) are no longer selected.

6. The computer-implemented method as recited in claim 1, wherein the at least some of the materials presented at (a) can be repeatedly selected for presentation to the user.

7. The computer-implemented method as recited in claim 1, wherein the additional materials to present be presented to the user at (c), also relate to the subject.

8. An article comprising: a non-transitory computer readable storage medium comprising a plurality of instructions for helping a user learn, the plurality of instructions, if executed by a computing device, result in the computing device:
   (a) presenting, by a display, materials to help the user learn, the display being coupled to a computing device, which comprises a rule storage medium, an assessment table including assessment attributes regarding users, and a recommendation generator;
   (b) retrieving, from the rule storage medium, at least two rules from a group of rules to help determine additional materials to present to the user,
   wherein each of the two rules includes a consequence and one or more conditions,
   wherein if any condition of each of the two rules is not satisfied, the consequence of the corresponding rule is false,
   wherein each of the two rules is represented in a table of attributes, with one attribute being the consequence of the rule and with one or more other attributes being the one or more conditions of the rule, wherein the table of attributes is stored in the rule storage medium, and wherein in retrieving the at least two rules, the consequence and the one or more conditions of each of the two rules are retrieved from the table of attributes in the rule storage medium;

(c) determining a recommendation, a by the recommendation generator, based on at least a rule from the table of attributes in the rule storage medium, for the additional materials to present to the user, after the materials at (a) have been presented; and (d) selecting, by the recommendation generator, at least some of the materials presented at (a) to the user via the display, for a further time to refresh the user's memory of the materials, wherein (c) includes:
analyzing at least the two rules to determine an inference, wherein the inference includes a consequence and at least one condition;
accessing at least two assessment attributes from the assessment table;
determining the at least two assessment attributes from the assessment table being in conflict with the consequence and the at least one condition of the inference; and
generating a new rule, which is added to the group of rules in the rule storage medium and which takes precedence over the at least two rules, in view of the conflict, to determine the recommendation for the additional materials to present via the display.

9. The article comprising a computer readable storage medium as recited in claim 8, wherein the instructions if executed further result in the at least some of the materials presented at (a) being selected at (d) for presentation to the user for the further time depending on the time elapsed from when the materials are presented user accesses the materials at (a).

10. The article comprising a computer readable storage medium as recited in claim 8, wherein the instructions if executed further result in the additional materials determined to present at (c), also relating to the subject.

11. A computer-implemented method for helping a user learn, the method comprising:
(a) presenting, by a display, materials to help the user learn, the display being coupled to a computing device, which comprises a rule storage medium, an assessment table including assessment attributes regarding users, and a recommendation generator;
(b) retrieving, by the recommendation generator from the rule storage medium, at least two rules from a group of rules, with at least one of the rules being related to a subject, to help determine additional materials to present to the user,
wherein each of the two rules includes a consequence and one or more conditions,
wherein if any condition of each of the two rules is not satisfied, the consequence of the corresponding rule is false,
wherein each of the two rules is represented in a table of attributes, with one attribute being the consequence of the rule and with one or more other attributes being the one or more conditions of the rule,
wherein the table of attributes is stored in the rule storage medium, and
wherein in retrieving the at least two rules, the consequence and the one or more conditions of each of the two rules are retrieved from the table of attributes in the rule storage medium; and (c) determining a recommendation, by the recommendation generator, based on at least a rule from the table of attributes in the rule storage medium, for the additional materials to present via the display, after the materials have been presented at (a), wherein the determining, by the recommendation generator, comprises:
analyzing at least the two rules to determine an inference, wherein the inference includes a consequence and at least one condition;
accessing at least two assessment attributes from the assessment table;
determining the at least two assessment attributes from the assessment table being in conflict with the consequence and the at least one condition of the inference; and
generating a new rule, which is added to the group of rules in the rule storage medium and which takes precedence over the at least two rules, in view of the conflict, to determine the recommendation for the additional materials to present via the display.

12. The computer-implemented method as recited in claim 11, wherein the additional materials to present to the user at (c), are determined depending on a time elapsed from when the materials are presented at (a).

13. The computer-implemented method as recited in claim 11, wherein the additional materials to present at (c), also relate to the subject.

14. The computer-implemented method as recited in claim 11, wherein the method further comprises, subsequent to generating the new rule, determining materials to present to another user based on the group of rules, which includes the new rule.

15. A non-transitory computer readable medium including at least executable computer program code tangibly stored therein for helping a user learn, said computer readable medium comprising:
(a) computer program code for presenting, by a display, materials to help the user learn, the display being coupled to a computing device, which comprises a rule storage medium, an assessment table including assessment attributes regarding users, and a recommendation generator;
(b) computer program code for retrieving, from the rule storage medium, at least two rules from a group of rules, with at least one of the rules being related to the subject, to help determine additional materials to present to the user,
wherein each of the two rules includes a consequence and one or more conditions,
wherein if any condition of each of the two rules is not satisfied, the consequence of the corresponding rule is false,
wherein each of the two rules is represented in a table of attributes, with one attribute being the consequence of the rule and with one or more other attributes being the one or more conditions of the rule,
wherein the table of attributes is stored in the rule storage medium, and
wherein in retrieving the at least two rules, the consequence and the one or more conditions of each of the two rules are retrieved from the table of attributes in the rule storage medium; and (c) computer program code for determining a recommendation, by the recommendation generator, based on at least a rule from the table of attributes in the rule storage medium, for the additional materials to present via the display, after the materials have been presented at (a), wherein the determining the recommendation comprises:

analyzing at least the two rules to determine an inference, wherein the inference includes a consequence and at least one condition;

accessing at least two assessment attributes from the assessment table;

determining the at least two assessment attributes from the assessment table being in conflict with the consequence and the at least one condition of the inference; and generating a new rule, which is added to the group of rules in the rule storage medium and which takes precedence over the at least two rules, in view of the conflict, to determine the recommendation for the additional materials to present via the display.

16. The non-transitory computer readable medium as recited in claim 15 further comprising computer program code for determining materials to present to another user based on the group of rules, which includes the new rule, subsequent to generating the new rule.

\* \* \* \* \*